(12) United States Patent
Yoshioka

(10) Patent No.: US 8,028,169 B2
(45) Date of Patent: Sep. 27, 2011

(54) ELECTRONIC DOCUMENT MANAGEMENT PROGRAM, ELECTRONIC DOCUMENT MANAGEMENT SYSTEM AND ELECTRONIC DOCUMENT MANAGEMENT METHOD

(75) Inventor: Takashi Yoshioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 822 days.

(21) Appl. No.: 11/544,404

(22) Filed: Oct. 6, 2006

(65) Prior Publication Data

US 2007/0130627 A1 Jun. 7, 2007

(30) Foreign Application Priority Data

Dec. 7, 2005 (JP) ................................. 2005-353525

(51) Int. Cl.
- H04L 9/32 (2006.01)
- H04L 29/06 (2006.01)
- G06F 12/14 (2006.01)
- G06F 7/04 (2006.01)
- G06F 17/00 (2006.01)

(52) U.S. Cl. ........ 713/176; 713/161; 713/165; 713/180; 713/181; 713/187; 713/189; 726/26; 707/698

(58) Field of Classification Search .................. 713/176, 713/161, 165, 180, 181, 187, 189; 726/26; 707/698

See application file for complete search history.

(56) References Cited

U.S. PATENT DOCUMENTS

| 7,317,799 B2 * | 1/2008 | Hammersmith et al. ..... 380/284 |
| 2003/0046351 A1 * | 3/2003 | Maruyama et al. ........... 709/206 |
| 2003/0120939 A1 * | 6/2003 | Hughes et al. ................ 713/191 |
| 2004/0145661 A1 * | 7/2004 | Murakami et al. ......... 348/222.1 |
| 2005/0015600 A1 * | 1/2005 | Miyazaki et al. ............. 713/176 |
| 2005/0097061 A1 * | 5/2005 | Shapiro et al. .................. 705/67 |

(Continued)

FOREIGN PATENT DOCUMENTS

| JP | 2000-285024 | 10/2000 |
| JP | 2001-117820 | 4/2001 |
| JP | 2005-031777 | 2/2005 |
| JP | 2005-165738 | 6/2005 |

OTHER PUBLICATIONS

Paper of Information Processing Society of Japan/Computer Security Group (CSEC) "Digital document sanitizing problem (Jul. 17, 2003) (2003-CSEC-22-009)".

(Continued)

Primary Examiner — Aravind Moorthy
(74) Attorney, Agent, or Firm — Greer, Burns & Crain, Ltd.

(57) ABSTRACT

It is possible to control electronic documents for partial disclosures and non-disclosures and prove to the third party that information other than non-disclosure part thereof has not been altered and the originality of decrypted information is assured. There is provided a section that controls electronic information for partial disclosures and non-disclosures according to conditions and situations such as viewers, systems and time and also a technological concept for proving to the third party that information other than non-disclosure part thereof has not been altered and the originality of decrypted information is assured, while controlling electronic information for partial disclosures and non-disclosures, by generating partial signature information (to be referred to as piat signature information in the embodiment of this invention which is described hereinafter) apart from the text of electronic information, dividing it for holding and separating the function and the role of electronic information and those of partial signature information (verifying information).

15 Claims, 16 Drawing Sheets

U.S. PATENT DOCUMENTS

2005/0235345 A1* 10/2005 Mitchell et al. .................. 726/10
2006/0117183 A1* 6/2006 Hatano et al. .................. 713/176

OTHER PUBLICATIONS

Paper of 2004 Symposium on Cryptography and Information Security, "A Digital Document Sanitizing Scheme with Disclosure Condition Control" Jan. 2004.

Yoshida et al., "Proposal on Partial Integrity Assurance Technology that Considers Correction and Distribution for Electronic Documents," FIT 2004, pp. 231-232.

Office Action issued by the Patent Office of Japan for Japanese Application No. 2005-353525, mailed Feb. 8, 2011 (with English language translation).

* cited by examiner

FIG.5

| DOCUMENT TITLE | DOCUMENT ID | USER NO. | PREPARER | POSITIONS TO BE CONCEALED | PARTIAL ENCRYPTION INFORMATION | TIME LIMIT INFORMATION |
|---|---|---|---|---|---|---|
| LETTER OF ORDER PLACEMENT | A001 | 33 | HANAKO SUZUKI | ORDER INFORMATION (ITEM) | WHOLESALER :: PUBLICKEY | YES |
| | | | | ACCOUNT SETTLING INFORMATION (NO) | CREDIT CARD COMPANY :: PUBLICKEY | YES |
| ⋮ | | | ⋮ | ⋮ | ⋮ | ⋮ |

FIG.7

◆ORDER RECEPTION SHEET (TO BE PROCESSED) - RESULTS◆

[1] [2] [3] [4] [5] [6] [7] [8]
[PREVIOUS PAGE] [NEXT PAGE]

[1-13] 160 ITEMS

| CUSTOMER CODE | CUSTOMER NAME | ITEM | PRICE NUMBER | QUANTITY | AMOUNT |
|---|---|---|---|---|---|
| 33 | HANAKO SUZUKI | [*ENCRYPTED*] | ***** | ***** | 10,000 |
|  |  | [*ENCRYPTED*] | ***** | ***** | 5,000 |
| 5 | MINORU YAMADA | ORANGE JUICE | 1,500 | 5 | 7,500 |
| 10 | HIDEO TANAKA | COFFEE BEANS | 1,000 | 1 | 1,000 |
|  |  | REFRIGERATED BEER | 3,500 | 2 | 7,000 |
|  |  | LEMON HIGHBALL | 2,600 | 5 | 13,000 |
|  |  | JAPANESE BEEF | 5,000 | 1 | 5,000 |
| 12 | KAORI YAMAMOTO | [*ENCRYPTED*] | ***** | ***** | 8,000 |
| 28 | SYOSUKE UENO | T-BONE | 16,000 | 5 | 80,000 |
|  |  | COFFEE BEANS | 1,000 | 1 | 1,000 |
|  |  | YUBARI MELON | 10,000 | 1 | 10,000 |
| 2 | GOROU SHINTANI | BARLEY WATER | 2,400 | 15 | 36000 |

[PREVIOUS PAGE] [NEXT PAGE]

END

| DOCUMENT TITLE | DOCUMENT ID | POSITIONS TO BE CONCEALED | TIME LIMIT INFORMATION |
|---|---|---|---|
| LETTER OF ORDER PLACEMENT | A001 | ORDER INFORMATION (ITEM) | 2005.9.1:AM0:00 |
| | | ACCOUNT SETTLING INFORMATION (NO) | 2005.9.8:AM0:00 |
| ⋮ | ⋮ | ⋮ | ⋮ |

ELECTRONIC DOCUMENT MANAGEMENT PROGRAM, ELECTRONIC DOCUMENT MANAGEMENT SYSTEM AND ELECTRONIC DOCUMENT MANAGEMENT METHOD

BACKGROUND OF THE INVENTION

1. Field of the Invention

The present invention relates to an electronic document management program, an electronic document management system and an electronic document management method that make it possible to prove to the third party that electronic data other than non-disclosed information are unaltered and the originality of decrypted information is assured, while controlling electronic data for partial disclosures and non-disclosures.

2. Description of the Related Art

As a result of the development of IT in recent years, the mode of usage and storage of administrative documents of central and local governments and books and contracts of private enterprises are gradually shifting from paper to electrons (digital signals). More specifically, it is already currently easy to turn paper documents into electronic data as scanners are being widely and popularly used. Additionally, as the resolution of scanners is improved, electronic storage of paper documents that has not hitherto been permitted is currently accepted provided that such a form of storage meets certain security requirements.

Meanwhile, as the demand for electronic storage of documents and images increases, techniques for safely storing and managing electronic data become indispensable. It is commonly accepted that technological requirements such as "detection and prevention of falsifications", "identification of the person who prepared a document", "access management and access control" and "history management" have to be met for electronically storing documents that have been stored on paper, while maintaining the level of trustworthiness of paper documents. Known document management systems are functionally not satisfactory for meeting those requirements. Therefore, efforts have been and being paid for developing and marketing "originality assurance systems" that meet those technological requirements.

The security element technique that is being most popularly used for "originality assurance systems" is electronic signature. It is possible to identify the person who prepared a document (identity) by means of electronic signature and prove and confirm that the document has not been altered (unfalsifiedness) since the time of preparation of the document to the third party. A technique of time stamp is also known. It is a technique that resembles electronic signature but, with time stamp, it is possible to prove the clock time when an electronic document is finalized in addition to the functions of electronic signature. Three related known techniques will be described below.

(1) Technique of Storing Original Electronic Documents

Patent Documents 1 and 2 (Jpn. Pat. Appln. Laid-Open Publication No. 2000-285024 and Jpn. Pat. Appln. Laid-Open Publication No. 2001-117820) are known as technique for assuring the originality of an electronic document.

(2) Technique of Blotting Out Electronic Documents

A method of solving the problem of blotting out electronic documents is proposed in Non-Pat. Document 1 (Information Processing Society/Computer Security Committee (CSEC) Paper "The Problem of Blotting out Electronic Documents" (Jul. 17, 2003) (2003-CSEC-22-009). Non-Pat. Document 2 (SCIS2004 Paper "A Technique of Blotting out Electronic Documents that can Control Disclosure Conditions").

(3) XACML (Extensible Access Control Markup Language)

This technique is authorized as standard by the OASIS (Organization for the Advancement of Structured Information Standards) and provides specifications for defining the right of accessing XML (extensible Markup Language) documents. With this technique, it is possible to describe "who" can access a resource at "what place" and by what "right". In other words, it is possible to control accesses that require judgment on complex conditions such as "users over twenty" or "only registered users".

The prior art originality assurance is directed to documents whose originals are stored at clearly identifiable places. In other words, the prior art is based on an idea similar to that of storing paper documents in key-locked lockers in the sense of managing the originals in a finalized format in safety. Then, in such an original storing environment, electronic signature is very effective for assuring the identify of a person and the unfalsifiedness of a document in such conditions.

However, from the viewpoint of originality assurance of documents to be subjected directly to additions, corrections, partial manipulations such as concealment and processing and circulated around such as letters of application and those of proposal, the general technique of electronic signature can make an obstacle because it does not allow any processing by natures. In other words, the prior art does not take manipulations, processing and circulations of documents into consideration and is centered at storing electronic data by means of electronic signature.

Now, the problems of the prior art of (1) through (3) listed above will be discussed below.

(1) Technique of Storing Original Electronic Documents

Pat. Documents 1 and 2 provide a technique of providing electronic information with characteristics of original paper documents when electronic data are stored and protecting electronic data against falsifications and, if falsified, detecting falsifications.

Thus, this technique is developed by paying attention on the mechanism of safely storing and managing electronic documents in the finalized format as originals whose places of storage are clearly identifiable in an organization.

In such an original storing environment, when an electronic document is corrected, if partly, the correction is recognized as "falsification". For example, when "correcting a letter of contract written on paper", "a character to be corrected is overwritten by double lines and sealed by the corrector, and the right character is written in a space located right above". If the character is corrected, the original of the letter of contract remains as proper and authentic original.

As far as paper is concerned, such an action of correction is officially judged to have followed proper procedures and its validity and authenticity can be proved to the third party.

On the other hand, if the conventional technique of storing an original is applied to an electronic document, there arises a problem that it is not possible to determine if the corrected part is a falsification or a correction made by following proper procedures because current electronic signature is designed and characterized in that any alteration made on electronic data can be detected.

(2) Technique of Blotting Out Electronic Documents

The paper on "the problem of blotting out electronic documents" proposes a technique of blotting out electronic documents that can dissolve the problem that the signature put to a document cannot be verified when the document is partly hidden. Thus, by applying the technique of blotting out electronic documents according to the paper, it is possible to verify the signature of a signed electronic document even when it is blotted out and prove to the third party that the document is not altered except the blotted out part or parts "to make it possible to prove to the third party in a condition of partly concealing (blotting out) the contents".

However, the technique of blotting out electronic documents according to the above-cited paper only assures the person who prepared an original document but cannot identify the person who blotted it out, if partly. Additionally, the paper describes a conceivable scene of utilization where the problem of blotting out electronic documents arises in an information disclosure system and an inhabitant argues with an administrative agency. In other words, the paper is written without taking a situation where a partly blotted out document is circulated among a plurality of entities and used by them into consideration.

Additionally, the technique replaces a blotted out part of an electronic document with hash information. In other words, it cannot control an electronic document for partial disclosures and non-disclosures depending on the condition and the situation of each viewer. Furthermore, the viewer cannot confirm and prove if non-disclosure part of information is prepared by the person who prepared the document and has not been altered.

(3) XACML (extensible Access Control Markup Language): Specification for Establishing the Right of Access to XML Documents This technique makes it possible to control "who" can access a resource at "what place" and by what "right". This known technique is realized by specifically relying on the fact that electronic documents can be controlled for partial disclosures and non-disclosures and it is possible to prove that non-disclosure part of information is not leaked to other than the entities (persons and systems) authorized for viewing. In other words, it is not possible to prove that information other than non-disclosure part thereof has not been altered (originality, integrity) and confirm or prove that non-disclosure part of information is prepared by the person who prepared the document and has not been altered.

SUMMARY OF THE INVENTION

In view of the above-identified problems, it is therefore the object of the present invention to make it possible to control electronic documents for partial disclosures and non-disclosures and prove to the third party that information other than non-disclosure part thereof has not been altered and the originality of decrypted information is assured.

To achieve the above object, the present invention provides a section that controls electronic information for partial disclosures and non-disclosures according to conditions and situations such as viewers, systems and time and also a technological concept for proving to the third party that information other than non-disclosure part thereof has not been altered and the originality of decrypted information is assured, while controlling electronic information for partial disclosures and non-disclosures, by generating partial signature information (to be referred to as piat signature information in the embodiment of this invention which is described hereinafter) apart from the text of electronic information, dividing it for holding and separating the function and the role of electronic information and those of partial signature information (verifying information).

In an aspect of the present invention, the above object is achieved by providing an electronic document management program for causing a computer to execute management of document information prepared by electronic information as original information, the program comprising: a partial signature processing step that detects existence or non-existence of one or more than one alternations to the original information and, if such existence is detected, identifies the location or locations of alteration and processes partial signature information in order to make it possible to prove to the third party that the original information is unaltered except the location or locations of alteration; a key generating/managing step that generates an encryption key for controlling accesses to any part of the original information according to conditions and situations; and a document managing step that registers and manages the original information and the partial signature information as integrated original information, while controlling accesses to any part of the original information.

Preferably, an electronic document management program according to the invention further comprises: a reception processing step that receives management of document information; a time limit managing step that manages time limit information of the encryption key managed in the key generating/managing step; and an information publicizing step that publicizes information to be publicized out of the integrated original information managed in the document managing step.

Preferably, in an electronic document management program according to the invention, the partial signature processing step includes: a partial signature generating step that executes a generation process for generating the partial signature information; and a partial signature verifying step that executes a verification process, using the partial signature information.

Preferably, in an electronic document management program according to the invention, the partial signature generating step divides the original information into a plurality of parts and generates the partial signature information according to the information of each part.

In an embodiment, the partial signature generating step generates the partial signature information, using a one-directional hash function.

In an embodiment, the partial signature generating step generates the partial signature information by adding other arbitrary information to the information of the each part.

In an embodiment, the partial signature information uses a random number as arbitrary information to be added to the information of the each part.

In an embodiment, the partial signature information uses time and date information as arbitrary information to be added to the information of each part.

In an embodiment, when the original information is partly corrected and/or altered typically by blotting out, the partial signature generating step generates new partial signature information by using arbitrary information that differs from the preceding version only in the altered part or parts but is same as the preceding version except the altered part or parts, whichever is appropriate.

In an embodiment, the partial signature verifying step controls the original information for partial disclosures and non-disclosures according to conditions and situations and confirms that the original information is unaltered other than the non-disclosed information and the originality of the non-disclosed information is assured Preferably, in an electronic document management program according to the invention, the key generating/managing step encrypts the encryption key by means of the public key of the entity (person or system) authorized for viewing and manages it.

Preferably, in an electronic document management program according to the invention, the time limit managing step holds time limit information on the encryption key managed in the key generating/managing step and controls accesses by using the time limit information.

Preferably, in an electronic document management program according to the invention, the time limit managing step nullifies the encryption key and accesses to the original information when the effective period of the encryption key is expired according to the time limit information on the encryption key managed in the timing limit managing step.

Preferably, in an electronic document management program according to the invention, the information publicizing step acquires, accumulates and publicizes only publicized information in cooperation with the document managing step.

Preferably, in an electronic document management program according to the invention, the partial signature processing step includes: a partial signature generating step that executes a generation process for generating the partial signature information; and a partial signature verifying step that executes a verification process, using the partial signature information.

Preferably, in an electronic document management program according to the invention, an electronic signature is put to the original information and also to the partial signature information.

Preferably, in an electronic document management program according to the invention, a time stamp is put to the original information and also to the partial signature information.

Preferably, in an electronic document management program according to the invention, the document managing step handles all electronic information to be registered as original information and, when original information is altered, it keeps the old version and holds the altered document as newly registered document so as to automatically manage version numbers.

Preferably, the document managing step separately manages the original information and the partial signature information, relates them mutually and centrally manage and control them.

In another aspect of the present invention, there is provided an electronic document management system for executing management of document information prepared by electronic information as original information, the system comprising: a partial signature processing section that detects existence or non-existence of one or more than one alternations to the original information and, if such existence is detected, identifies the location or locations of alteration and processes partial signature information in order to make it possible to prove to the third party that the original information is unaltered except the position or positions of alteration; a key generating/managing section that generates an encryption key for controlling accesses to any part of the original information according to conditions and situations; and a document managing section that registers and manages the original information and the partial signature information as integrated original information, while controlling accesses to any part of the original information.

In still another aspect of the present invention, there is provided an electronic document management method of executing management of document information prepared by electronic information as original information by means of a computer, the method comprising: a partial signature processing step that detects existence or non-existence of one or more than one alternations to the original information and, if such existence is detected, identifies the location or locations of alteration and processes partial signature information in order to make it possible to prove to the third party that the original information is unaltered except the location or locations of alteration; a key generating/managing step that generates an encryption key for controlling accesses to any part of the original information according to conditions and situations; and a document managing step that registers and manages the original information and the partial signature information as integrated original information, while controlling accesses to any part of the original information.

Thus, the present invention provides the following advantages.

(1) It is possible to control electronic data for partial disclosures and non-disclosures and prove that non-disclosure part of information is not leaked to other than the entities (persons and systems) authorized for viewing.

(2) It is possible to discriminate parts of non-disclosure and other parts and prove that information other than non-disclosure part thereof has not been altered (originality, integrity).

(3) It is possible to identify and prove the person who controls non-disclosures.

(4) It is possible to prove that non-disclosure part of information is prepared by the person who prepared the document and has not been altered.

(5) It is possible to prove that, if electronic data are partly concealed, the remaining part other than the concealed part of the data is not altered.

(6) It is possible to prove, if electronic data are partly concealed, the person who prepared the unconcealed part.

(7) It is possible to prove the history (when, who, what part or parts, how) of electronic data from the original (first version).

(8) It is possible to prove to the third part and distribute electronic data in a state of partly blotted out and/or by using a version or some versions without taking out the electronic data of all versions stored and managed in the system.

BRIEF DESCRIPTION OF THE DRAWINGS

FIG. 5 is a schematic illustration of exemplary entries of a management TB in the document managing section;

FIG. 7 is a schematic illustration of an example of display of an order reception sheet;

DETAILED DESCRIPTION OF THE PREFERRED EMBODIMENTS

Figure 1:
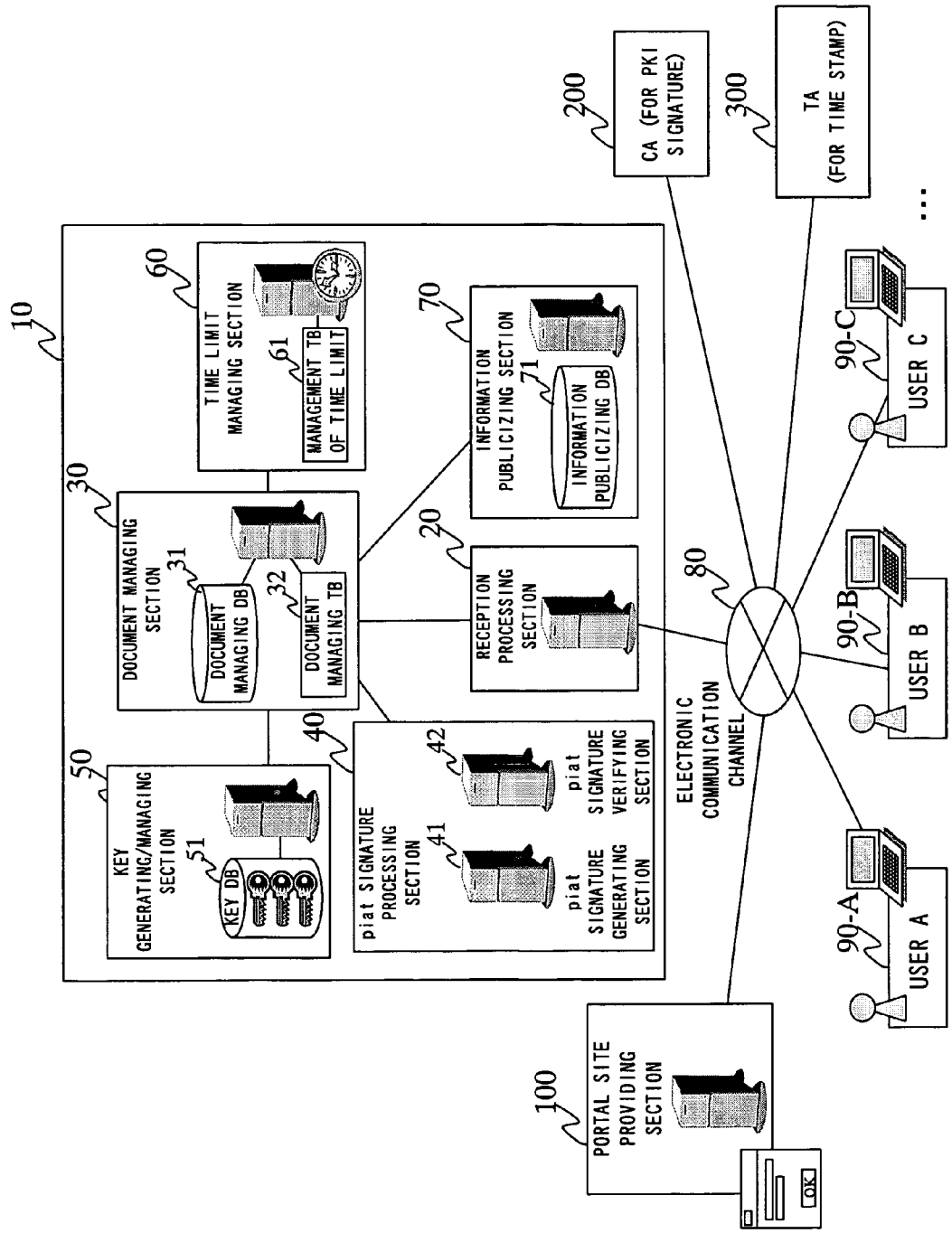
FIG. 1 is a schematic block diagram of electronic document management system according to the invention, showing the principle and the configuration thereof.

FIG. 1 is a schematic block diagram of an electronic document management system according to an embodiment of the present invention that is a partial integrity assurance system having a viewers controlling feature formed on an assumption that the entities authorized for viewing are persons (viewers, users), showing the principle and the configuration thereof. The partial integrity assurance system 10 having a viewers controlling feature illustrated in FIG. 1 comprises a reception processing section 20, a document managing section 30, a piat signature processing section 40, a key generating/managing section 50, a time limit managing section 60 and an information publicizing section 70. The configuration and the role of each of the sections will be described below.

(Reception Processing Section 20)

The reception processing section 20 is a hub section that receives information input by users (90-A, B, C, . . . ), a portal site providing section 100, a CA (certificate authority) 200 and a TA (time authority) 300 and transmits output information to the above listed sections. It receives processing requests from the above listed sections 40 through 70, acts as processing intermediator for the document managing section 30 and returns the results of processing operations to the sections 40 through 70.

(Document Managing Section 30)

The document managing section 30 receives input processing requests from the reception processing section 20 and provides a section that executes a process that matches each request. The document managing section 30 is constituted by two sub-elements including a document managing DB (database) 31 for storing processed electronic information and a document managing TB (table) for managing the entry information of processed electronic information.

(Document Managing DB 31)

The document managing DB 31 is managed in the document managing section 30 and, upon receiving a storage request, it operates for storing electronic information and partial signature information in an integrated form.

(Document Managing TB 32)

The document managing TB 32 is managed in the document managing section 30 and manages the entry information of electronic information simultaneously with a process storing electronic information in the document managing DB 31.

(Piat Signature Processing Section 40)

The piat signature processing section 40 receives piat signature processing requests from the document managing section 30 and provides a section that executes a process that matches each request. The piat signature processing section 40 is constituted by two sub-elements including a piat signature generating section 41 and a piat signature verifying section 42.

(Piat Signature Generating Section 41)

The piat signature generating section 41 receives piat signature generation requests from the document managing section 30 and generates partial signature information for electronic information.

(Piat Signature Verifying Section 42)

The piat signature verifying section 42 receives piat signature verification requests from the document managing section 30 and verifies partial signature information for electronic information.

(Key Generating/Managing Section 50)

The key generating/managing section 50 receives key generation/management requests from the document managing section 30 and provides a section that generates and manages an encryption key for controlling viewers. The key generating/managing section 50 is constituted by a sub-element that is a key DB (key database) for storing generated encryption keys.

(Key DB 51)

The key DB 51 is managed in the key generating/managing section 50 and, upon receiving a storage request, it operates for storing an encryption key for controlling viewers.

(Time Limit Managing Section 60)

The time limit managing section 60 receives processing requests from the document managing section 30, extracts time limit information managed by it and verifies the time limit of an encryption key.

(Information Publicizing Section 70)

The information publicizing section 70 receives processing requests from the document managing section 30, acquires, accumulates and publicizes only publicized information from the document managing DB 31 in the document managing section 30 for a user 90. The information publicizing section 70 is constituted by a sub-element that is an information publicizing DB 71.

(Information Publicizing DB 71)

The information publicizing DB 71 is managed in the information publicizing section 70 and, upon receiving a storage request, it operates for storing electronic information and partial signature information in an integrated form.

The configuration and the role of each of the sections of the partial integrity assurance system 10 having a viewers controlling feature are described above. Now, the external actors that are found along the periphery of the partial integrity assurance system 10 having a viewers controlling feature will be described below.

(Electronic Communication Channel 80)

An electronic communication channel 80 operates as a section that transmits and distributes processing requests from each actor and electronic information. The partial integrity assurance system 10 having a viewers controlling feature and all the external actors that are found along the periphery thereof are connected to the electronic communication channel 80. The electronic communication channel 80 may correspond to any communication protocol such as the Internet, intranets, extranets and wide area networks.

(User 90)

A user 90 is an actor who uses the partial integrity assurance system 10 having viewers controlling feature and the portal site providing section 100. A user 90 can access the partial integrity assurance system 10 with viewers controlling feature and the portal site providing section 100 by way of the electronic combustion channel 80.

(Portal Site Providing Section 100)

The portal site providing section 100 operates as a section that provides an input form and a processing menu for the purpose of generating electronic information necessary for transmitting a processing request to the partial integrity assurance system 10 having a viewers controlling feature. In certain cases, it is provided so as to cooperate with the partial integrity assurance system 10 having a viewers controlling feature.

(CA 200)

The CA 200 is an actor that puts an electronic signature (PKI signature) to electronic information in order to make it possible to check the person who prepared the electronic information and assure that the electronic information has not been falsified. CA is an abbreviation of Certificate Authority and it is possible to underline the credibility and the truthfulness of information and rigorously prove to the third party by adopting a certificate issued by the authority.

(TA 300)

The TA 300 is an actor that puts a time stamp to electronic information in order to assure that the electronic information has not been falsified from the time of putting the time stamp (assure the clock time when the electronic information is finalized) in addition to the PKI signature. TA is an abbreviation of Time Authority and, like CA, it is possible to underline the credibility and the truthfulness of information and rigorously prove to the third party by adopting a certificate issued by the authority.

Now, a method of applying the above-described system will be described below by way of assumed scenes of utilization. More specifically, two schemes of utilization including an information distribution scheme for electronic trading (net shopping) between a business and a consumer (B to C: business to consumer) and an information publicizing scheme of a local government document management system are assumed here. Firstly, the information distribution scheme for B to C electronic trading (net shopping) will be described below.

When a user uses this system, he or she may electronically prepare a letter of order placement or prepares a paper letter or order placement, turns it into an electronic letter by means of a scanner and then records/stores it as signed letter of order placement. The recorded/stored signed letter of order placement may be distributed among a plurality of entities and, if necessary, presented to the third party for the purpose of checking the authenticity of the letter of order placement. When it is distributed among a plurality of entities, it may be required to be subjected to partial disclosures or non-disclosures if necessary.

For example, assume that the letter of order placement is sent from the consumer (requester) to a wholesaler and then to a credit card company (liquidating organization) for the purpose of settling the account. It may be necessary to conceal the credit card number from the wholesaler as important personal information and conceal the item or items that the requester purchases from the credit card company (liquidating organization) also as important personal information. In such a case, the letter of order placement is required to be controllable for partial disclosures and non-disclosures and the properness and the proof-worthiness of the operations done for disclosures and non-disclosures have to be assured in order to prove that the non-disclosure part of the information is not leaked to anyone other than the authorized viewer or viewers, that the information is not altered except the non-disclosure part thereof (originality, integrity) and that the non-disclosure part of the information is prepared by the requester and has not been altered.

Therefore, the user uses this system as a section that keeps a record that can be produced as evidence when a dispute arises from the letter of order placement and is taken to court or when proving to the third party the authenticity of the letter of order placement. Thus, the characters who appear in the scene of utilization of this system include "a requester" who registers the letter or order placement to the system, "a wholesaler" who receives the letter of order placement in response to the request of the requester, confirms the contents of the request and processes the received order and "a credit card company" who receives the letter of order placement in response to the request of "the wholesaler", checks the contents for settling the account and processes the account.

In the above-described scene of utilization, this system provides the following four functions to the requester, the wholesaler and the credit card company.

(A) Registration function (generation of a letter of order placement to be used by the requester at the time of registration)

(B) Confirmation function (to be used by the wholesaler and the credit card company at the time of confirming the contents of the letter of order placement)

(C) Updating function (to be used by the wholesaler and the credit card company at the time of receiving and accepting the letter or order placement).

(D) Acquisition function (to be used by the requester, the wholesaler and the credit card company at the time of acquiring the letter of order placement Now, the effects of the above listed events (A) through (D) will be described below.

It is assumed here as the requirement to be met in advance for this scene of utilization that the user authenticating information of the requester (90-A), that of the wholesaler (90-B) and that of the credit card company (90-C) are registered in advance so that the users may use the partial integrity assurance system 10 having a viewers controlling feature and the portal site providing section 100 and are rigorously controlled for accesses. It is also assumed here for this scene of utilization that information is electronic information from the beginning.

(Sequence of Generation of Letter of Order Placement)

Figure 2:
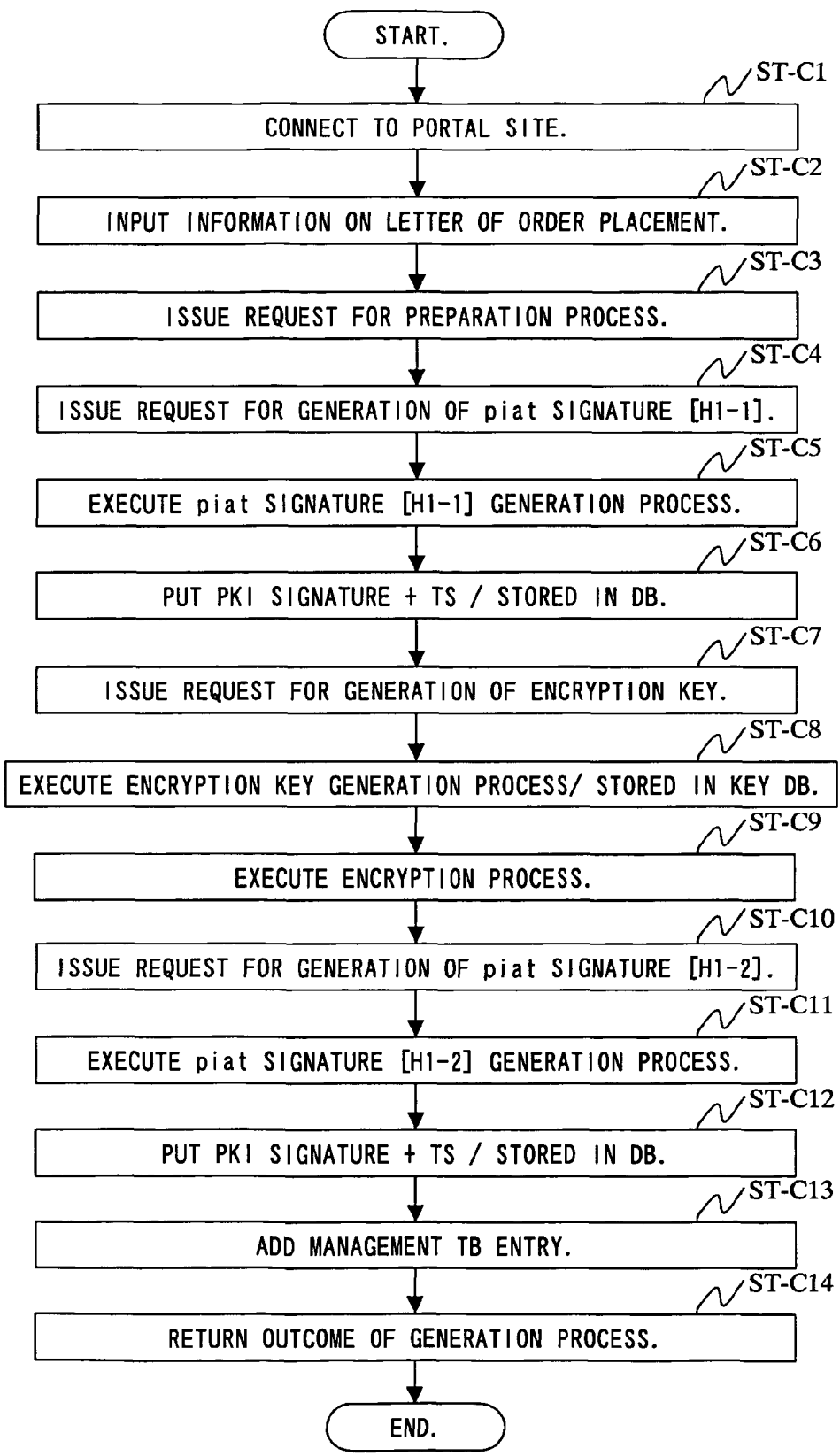
FIG. 2 is a flowchart of the process of generation of a letter of order placement.

FIG. 2 is a flowchart of the process of generating a letter of order placement.

(1) The requester (90-A) connects himself or herself to the portal site providing section 100 by way of the electronic communication channel 80 and accesses the net shopping site that the wholesaler (90-B) provides (Step ST-C1). At this time, it is assumed that the requester (90-A) has already been registered as user at the net shopping site.

(2) The requester (90-A) typically logs in by means of his or her ID and a password and input necessary information in the letter of order placement input form (Step ST-C2). At this time, assume that information to be input includes personal information for identifying the requester such as the name, the address and so on, order information for identifying the ordered item or items and the ordered number of pieces of the item or each of the items (the item name or each of the item names) and account settling information (NO) including information on the credit card of the requester.

(3) As the requester (90-A) executes a post-input finalization process, the portal site providing section 100 issues a request for a preparation process to the partial integrity assurance system 10 having a viewers controlling feature, standing proxy for the requester (90-A) (Step ST-C3). While it is so arranged that the portal site providing section 100 issues a request for a preparation process, standing proxy for the requester (90-A) here, it may alternatively be so arranged that the portal site providing section 10 returns the data of the letter of order placement (e.g., in the data format for XML data) to the requester (90-A) after the finalization of the input and the requester (90-A) issues a request for a preparation process to the partial integrity assurance system 10 having a viewers controlling feature.

(4) The reception processing section 20 receives the request for a preparation process from the portal site providing section 100. The information it receives at this time includes the letter of order placement [D1-1] (e.g., in the data format for XML data) and is accompanied by requirements for secret processing. Requirements for secret processing include information on the part or parts to be encrypted ("order information (the item name or each of the item names") and "account settling information (NO)" in this example) and who is or are authorized for viewing (only the wholesaler is authorized to view "order information (the item name or each of the item names)" and only the credit card company is authorized to view "account settling information (NO)" in this example). It is desirable that these requirements are defined in advance in the portal site providing section 100 by the wholesaler (90-B) as requirement policy and automatically extracted at the time of receiving the request. Thus, the requester (90-A) can safely enjoy net shopping without realizing the defined security and control measures. The requirement policy can be retrieved with ease if each document of requirement policy is provided and managed with ID.

(5) Upon receiving the request, the reception processing section 20 issues a request for a preparation process to the document managing section 30.

(6) As the document managing section 30 receives the request for a preparation process, it issues a request for generating piat signature information [H1-1] to the piat signature generating section 41 in the piat signature processing section 40 (Step ST-C4). At this time, the letter of order placement [D1-1] is given. The piat signature information is so-called partial signature information to be used for detecting any alteration made to the letter of order placement, identifying the altered part or parts (position or positions of alteration) and additionally making it possible to prove to the third party that the letter of order placement is not altered other than the position or positions of alteration. Since it is a problem if the contents of the letter of order placement are presumed from the piat signature information, it is desirable that the piat signature information is generated by combining a one-directional hash function and a random number.

Figure 3:
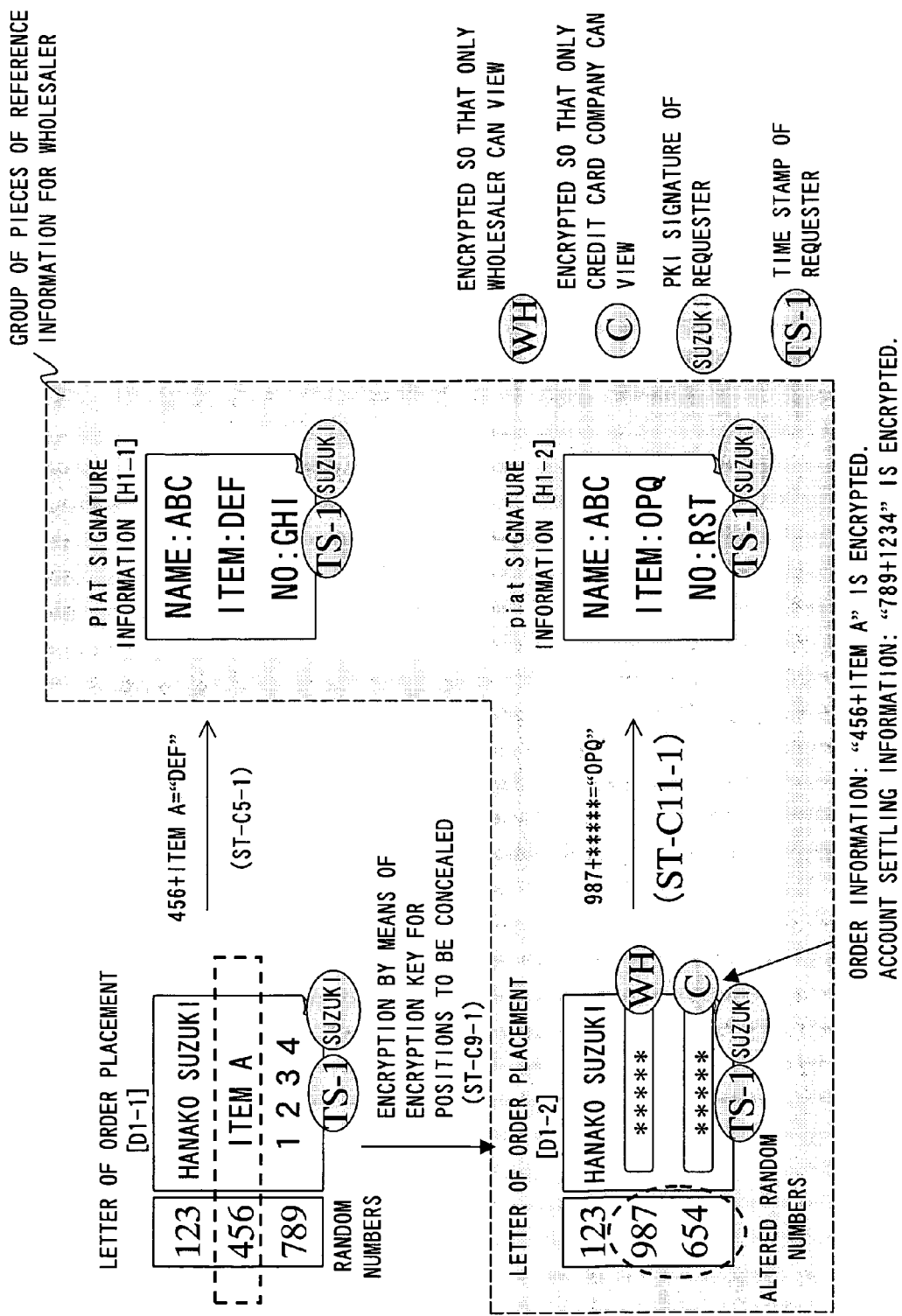
FIG. 3 is a schematic illustration of an example of generated piat signature information at the time of the generation process.

(7) As the piat signature generating section 41 receives the request for a process, it generates piat signature information [H1-1] for the letter of order placement [D1-1] (Step ST-C5). FIG. 3 is a schematic illustration of an example of generated piat signature information at the time of the generation process. For example, a character string of "item A" is linked to a random number "456" and hash information is generated for the character string of "456 item A". Then, hash information of "DEF" is output as a result of the generation. After the (Step ST-C5-1), a similar generation process is executed for the other item or each of the other items. While a random number is used in this example, a technique that does not use a random number may be used for achieving the object. For example, clock time information indicating the time of input may alternatively be used.

(8) The document managing section 30 acquires the piat signature information [H1-1] from the piat signature generating section 41. The piat signature information [H1-1] takes the above-described role and, at the same time, it is used by the viewer to check the originality of the non-disclosure information when the viewer decrypts it. Thus, as the letter of order placement [D1-1] and the piat signature information [H1-1] are in place at this time, the electronic signature that employs the PKI (public key infrastructure) of the requester (90-A) (to be referred to simply as PKI signature hereinafter) and the time stamp (to be referred to simply as TS hereinafter) are put to each of the pieces of information and the two pieces of information are integrally stored in the DB 31 (Step ST-C6). Thus, it is possible to underline the credibility and the truthfulness of the information and rigorously prove to the third party by adopting the PKI signature and the time stamp issued respectively by the CA 200 and the TA 300 that are public organizations.

(9) Then, the operation moves into the phase of partial encryption. A request for generating an encryption key is issued to the key generating/managing section 50 for the purpose of generation of a key for encryption (Step ST-C7). The information to be used here is the requirements for secret processing acquired before and hence the encryption key is generated on the basis of these requirements. In this example, two keys are generated in order to encrypt the two pieces of information including "the order information (the item name or each of the item names)" and "the account settling information (NO)".

Figure 4:
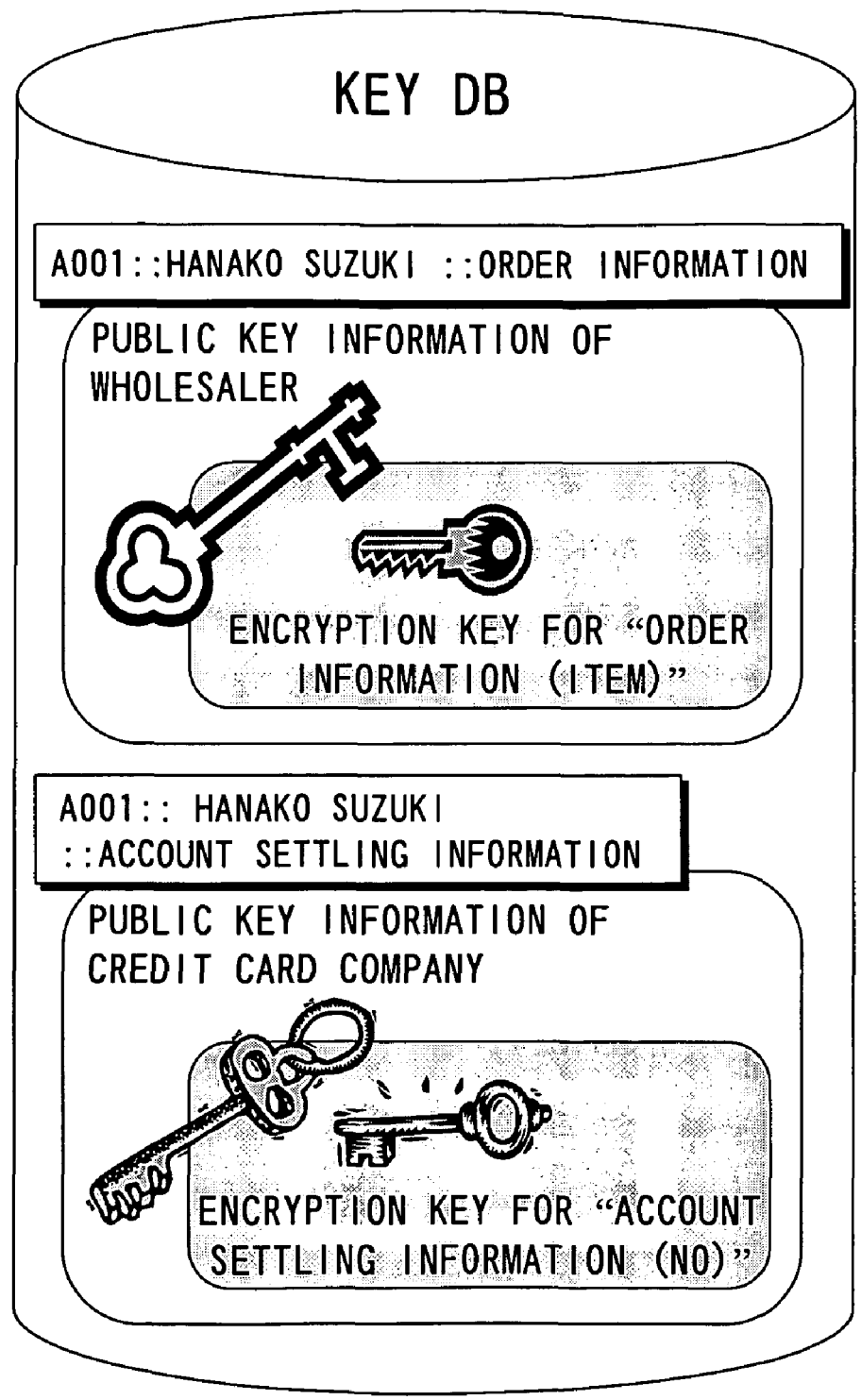
FIG. 4 is a schematic illustration of key management.

(10) The key generating/managing section 50 generates encryption keys (common keys), one for "the order information (the item name or each of the item names)" and the other for "the account settling information (NO)" and stores them in the key DB 51 (Step ST-C8). FIG. 4 is a schematic illustration of the inside of the key DB 51. The keys are stored in the key DB 51 in a manner as described below. The encryption keys (common keys) of the respective secret positions are encrypted by means of the publicized key information of each possible viewer. In this example, the encryption key for "the order information (the item name or each of the item names)" is encrypted by means of the publicized key information of the wholesaler (90-B) and the encryption key for "the account setting information (NO)" is encrypted by the publicized key information of the credit card company (90-C) for "the order information (the item name or each of the item names)".

While a single viewer is controlled for a single position in this example, a similar technique can be used flexibly for managing a situation where a plurality of viewers are controlled for a single position. Additionally, it is possible to prevent the encryption key (common key) from leaking by the time limit managing section 60 controlling/managing the encryption key. In other words, it is possible to prevent the important information (credit card number, etc.) contained in the letter of order placement that is encrypted by the encryption key from leaking. For example, the important information may be secured by controlling it in such a way that the newly generated letter of order placement can be decrypted (so as to be used for settling the account for it) within two weeks after the generation but not thereafter

(11) The document managing section 30 receives the encryption key from the key generation/managing section 50 and encrypts each of the secret positions in the letter of order placement [D1-1] by means of the encryption key of that position (Step ST-C9). At this time, the random members for the secret positions in the letter of order placement [D1-1] are respectively coupled with the information to be encrypted and they are encrypted (Step ST-C9-1 in FIG. 3). More specifically, "456+item A" is encrypted for "the order information (the item name)" and "789+1234" is encrypted for the account settling information (NO). This way of generation of information is used to allow the viewer to confirm the originality of the non-disclosure information when the viewer decrypts it. After completing the encryption processes, the partly encrypted letter of order placement [D1-2] is temporarily stored. At this time, it is desirable to use XML partial encryption when the letter of order placement is in the XML data format.

(12) Subsequently, the document managing section 30 issues a request for generating piat signature information [H1-2] to the piat signature generating section 41 in the piat signature processing section 40. At this time, the temporarily stored partly encrypted letter of order placement [D1-2] is delivered to it (Step STC-10).

(13) The piat signature generating section 41 that receives the processing request generates piat signature information [H1-2] for the partly encrypted letter of order placement [D1-2] (Step ST-C11). When generating the piat signature information, the piat signature generating section 41 alters the random number of "the order information (the item name)" and that of "the account setting information (NO)" produced by decrypting those of the "letter of order placement" [D1-1] and then generates new piat signature information [H1-2] but uses the random number of "the name" (which is the single position that is not decrypted and not altered since the last process) same as that of the letter of order placement [D1-1]. Thus, it is possible to prove to the third party that "the name" has not been altered and the requester himself or herself described it by comparing the generated two pieces of piat signature information [H1-1] and [H1-2].

Step ST-C11-1 in FIG. 3 illustrates the above-described operation. The random number of "the order information (the item name)" is altered from "465" to "987" and the random number of "the account setting information (NO)" is altered from "789" to "654" and linked with the encrypted information (it is assumed in this example that "the order information (the item name)" and "the account settling information (NO)" are encrypted to become "*****" in this example) to generate hash information so that as a result of the generation process "the order information (the item name)" and "the account settling information (NO)" are turned respectively to "OPQ" and "RST".

(14) The document managing section 30 acquires the piat signature information [H1-2] from the piat signature generating section 41. Thus, since the partly encrypted letter of order placement [D1-2] and the piat signature information [H1-2] are in place now, the PKI signature of the requester (90-A) and the TS are added to each piece of information and the two pieces of information are integrated and stored in the DB 31 (Step ST-C12). At this time, they are separated from the letter of order placement [D1-1] and the piat signature information [H1-1] that have already been stored for management. In this way, the version numbers are automatically managed. Thus, it is possible to prove to the third party the condition of the version of an appropriate version number whenever necessary by using the DB 31 having the version number managing feature.

(15) As all the processing steps are completed normally, the information on the letter of order placement is entered in the management TB 32 in the document managing section 30 (Step ST-C13). Thus, each entry of the management TB 30 includes "the document name", "the document ID", "the user NO", "the secret position or positions", "the partial encryption information" and "the time limit information". FIG. 5 illustrates the composition of the table. Both the order information (the item name or names) and the account settling information (NO) of the letter of order placement prepared by the requester (Ms. Hanako Suzuki) are partly encrypted with a time limit by means of the encryption key of each entity and properly registered by means of the document ID="A001". New information is added to the management TB each time of registration. It is desirable to add the PKI signature and the TS of the system in order to secure the originality and the credibility of the entry information.

(16) Finally, the encrypted letter of order placement [D1-2] is returned to the requester (90-A) to properly end the preparation process (Step ST-C14). If an abnormal situation arises, the requester (90-A) is notified of the error and the process ends abnormally. In this example, it is assumed that all the versions are stored in the DB 31 and managed and only the encrypted letter of order placement [D1-2] is returned to the requester (90-A). However, both the piat signature information [H1-1] and the piat signature information [H1-2] may be returned with the encrypted letter of order placement [D1-2]. At this time, the requester (90-A) may transmit all the three pieces of information including the encrypted letter of order placement [D1-2], the piat signature information [H1-1] and the piat signature information [H1-2] (the group of pieces of reference information for the wholesaler in FIG. 3) by means of electronic mail.

(Sequence of Confirmation of Letter of Order Placement (at the Wholesaler Side))

Figure 6:
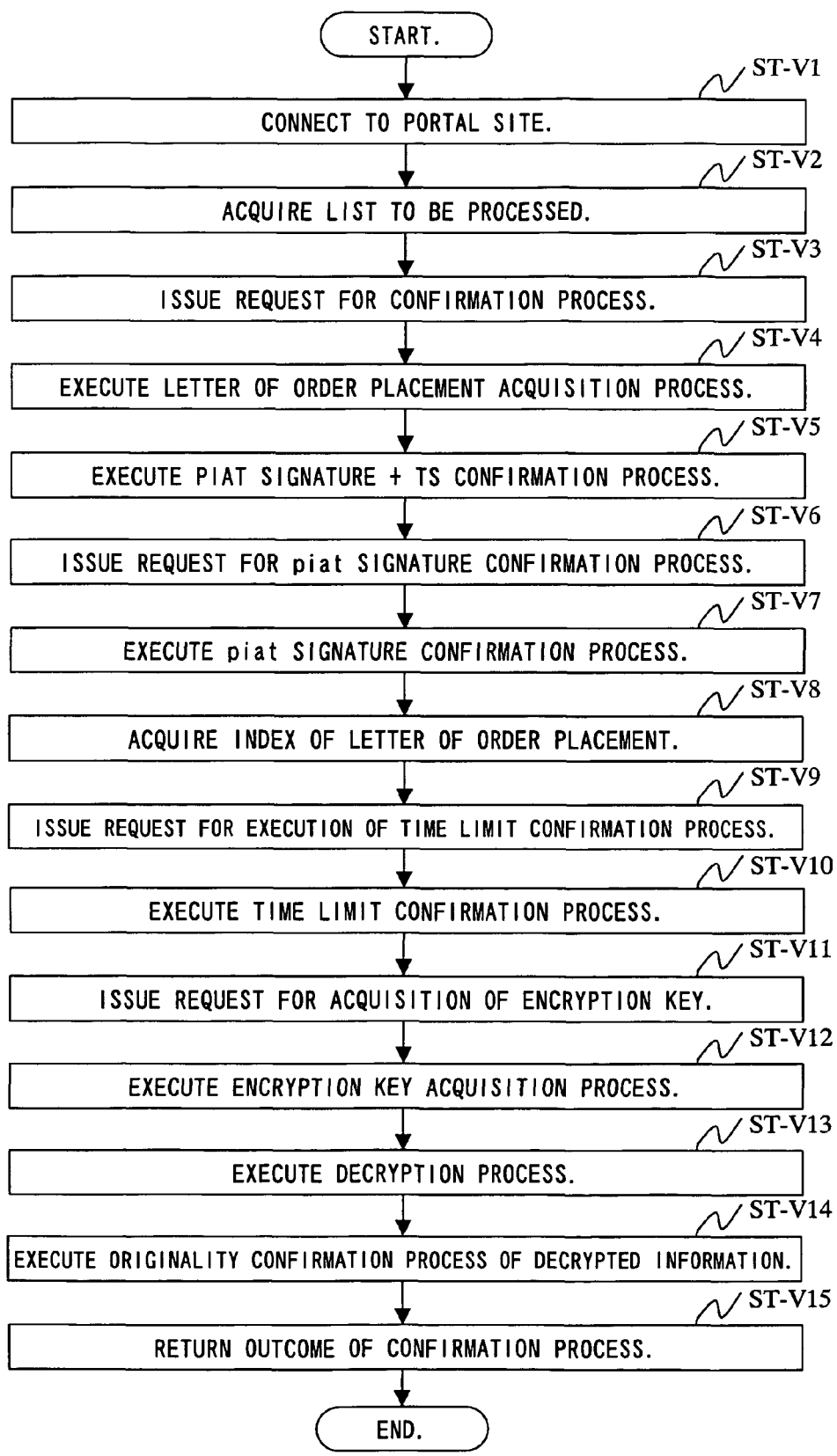
FIG. 6 is a flowchart of the process of confirmation of a letter of order placement.

FIG. 6 is a flowchart of the process of confirming a letter of order placement.

(1) The wholesaler (90-B) receives the order placement/request placed by the requester (90-A) by some means or other. At this time, the person in charge of the wholesaler (90-B) may periodically connect itself to the portal site providing section 100 by way of the electronic communication channel 80 and acquire an order reception table (a list to be processed) as a section that acquires the order placement/request. The wholesaler (90-B) may directly receive the order placement/request placed by the requester (90-A) by means of electronic mail. Anyway, the sequence starts when the wholesaler receives the order reception sheet (a list of matters to be processed) and confirms the letter of order placement in this example.

(2) The wholesaler (90-B) connects itself to the portal site providing section 100 by way of the electronic communication channel (80) (Step ST-V1), receives the order reception sheet (the list of matters to be processed) and has it displayed (Step ST-V2). FIG. 7 is a schematic illustration of an example of display of an order reception sheet. It shows that the letter of order placement prepared by the requester ((90-A)=Ms. Hanako Suzuki) before is displayed as a matter to be processed.

(3) The wholesaler (90-B) may select the requester ((90-A)= Ms. Hanako Suzuki) from the order reception sheet. The portal site providing section 100 then issues a confirmation processing request to the partial integrity assurance system 100 having a viewers controlling feature (Step ST-V3).

(4) The reception processing section 20 receives the confirmation processing request from the portal site providing section 100. The information that the reception processing section 20 receives at this time is the index of the letter of order placement of the requester ((90-A)=Ms. Hanako Suzuki). An index of a letter of order placement refers to information necessary for retrieving information on entries that includes the document ID, the user NO (the customer code), the person who prepared the letter of order placement (the customer name) and so on.

(5) Upon receiving the confirmation processing request, the reception processing section 20 by turn issues a confirmation processing request to the document managing section 30.

(6) Upon receiving the confirmation processing request, the document managing section 30 firstly checks the management TB 32 on the basis of the index of the letter of order placement and acquires the letter of order placement from the DB 31 (Step ST-V4). The information the document managing section 30 acquires includes three pieces of information, or the encrypted letter of order placement [D1-2], the piat signature information [H1-1], the piat signature information [H1-2]. In other words, the information includes the group of pieces of reference information for the wholesaler in FIG. 3. Thus, the three pieces of information are referred to as "the group of pieces of reference information for the wholesaler" hereinafter.

(7) As the acquisition process is completed, the document processing section 30 checks the effectiveness of the PKI signature and the TS added to the group of pieces of reference information for the wholesaler (Step ST-V5). This checking operation is performed to confirm that the information has not been altered since it was stored in the DB 31. The document managing section 30 inquires the CA 200 for the PKI signature and the TA 300 for the TS by way of the electronic communication channel 80 and acquires the outcome of verification.

(8) When it is confirmed that the PKI signature and the TS added to the group of pieces of reference information for the wholesaler are effective, the document managing section 30 issues a confirmation request to the piat signature verifying section 42 in the piat signature processing section 40 for the group of pieces of reference information for the wholesaler (Step ST-V6). At this time, the group of pieces of reference information for the wholesaler is delivered.

Figure 8:
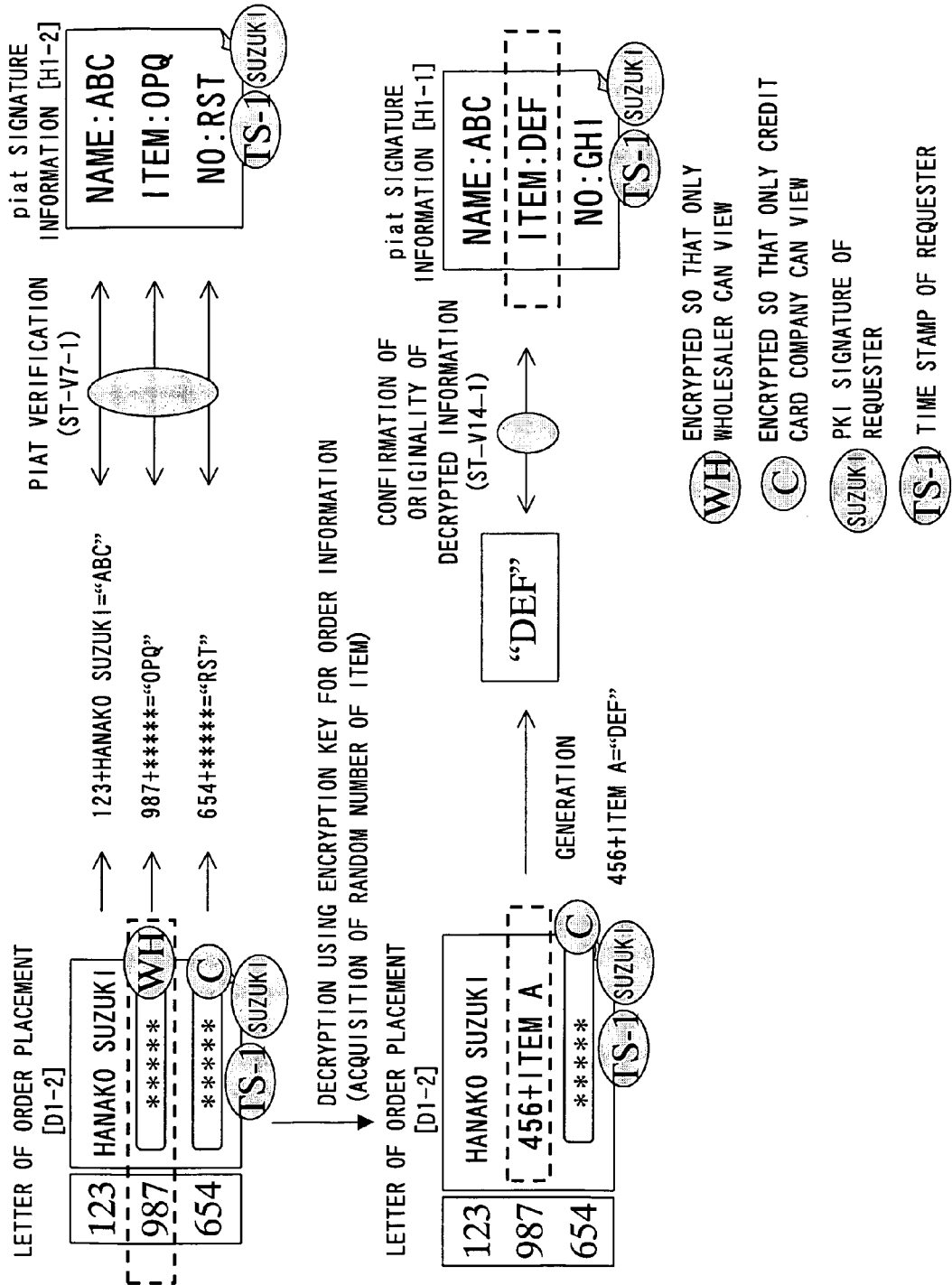
FIG. 8 is a schematic illustration of an example of confirmation of a group of pieces of reference information for a wholesaler to be used in the confirmation process.

(9) Upon receiving the processing request, the piat signature verifying section 42 executes a verification process, using the group of pieces of reference information for the wholesaler (Step ST-V7). FIG. 8 is a schematic illustration of an example of confirmation of a group of pieces of reference information for a wholesaler to be used in the confirmation process. Referring to FIG. 8, the random number "123" and the character string of "Hanako Suzuki (鈴木花子) are linked from the encrypted letter of order placement [D1-2] and hash information is generated for the character string of "123 Hanako Suzuki (123 鈴木花子)". As a result, hash information of "ABC" is obtained. Additionally, FIG. 8 shows that the piat signature verifying section 42 takes out the hash information of the name part from the piat signature information [H1-2] for comparison and confirmation (Step ST-V7-1). A similar confirmation process is executed for each of the remaining items.

(10) The document managing section 30 acquires the outcome of confirmation from the piat signature verifying section 42. Then, it moves into the decrypting phase of the encrypted letter of order placement [D1-2]. In this phase, the document managing section 30 acquires "the secret position or positions", "the partial encryption information" and "the time limit information" in the management TB 32 from the index of the letter of order placement (Step ST-V8). At this time, since it is possible to make sure that "the secret position or positions" and "the partial encryption information" have been encrypted by means of the public key of the wholesaler (90-B), it is only possible to make sure that "the order information (item name or names)" can be decrypted. "The time limit information" shows that they can be decrypted by the time and day it indicates. At this time, the document managing section 30 inquires the time limit managing section 60 (Step ST-V9).

Figures 9, 10:
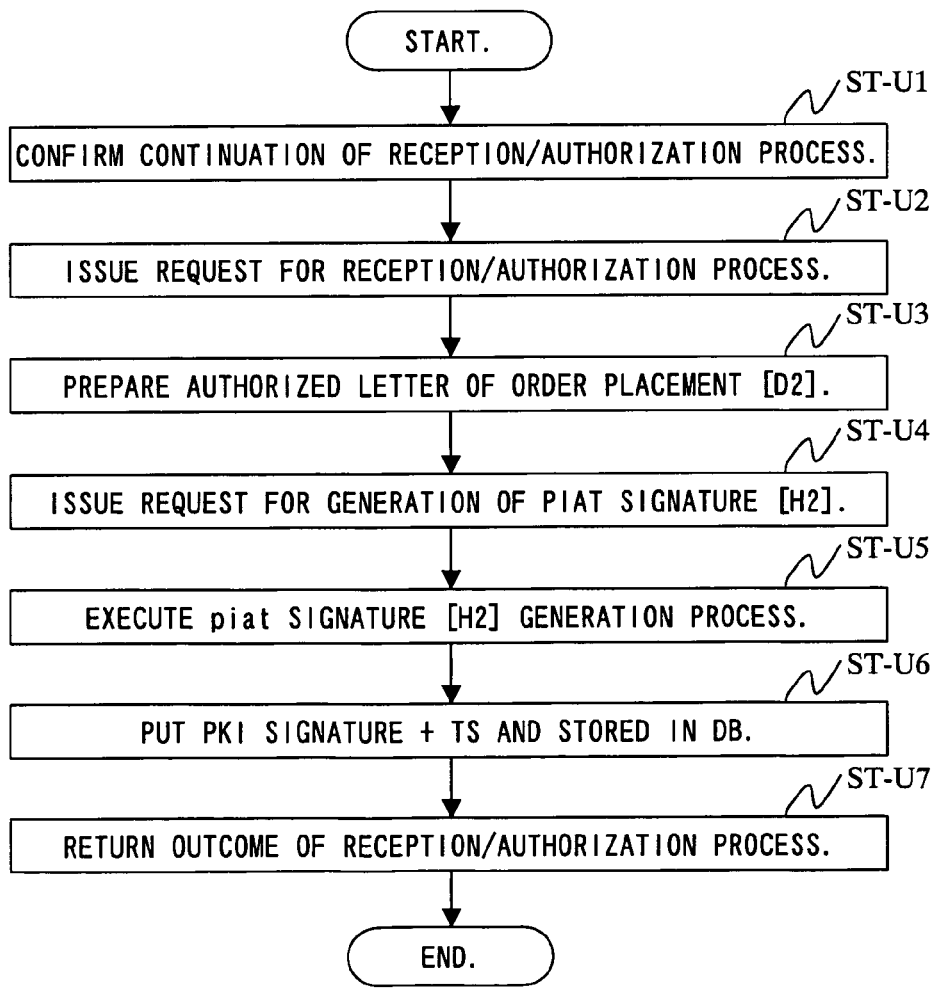
FIG. 9 is a schematic illustration of exemplary entries of a management TB in the time limit managing section.
FIG. 10 is a flowchart of the process of reception/authorization of a letter of order placement.

At this time, "the document ID" and "the order information (the item name or names) are delivered from the document managing section 30 and the time limit managing section 60 checks the management TB 61 of the time limit managing section 60 to acquire the time limit information and compares it with the current time and date. It authorizes the decryption if the time limit is not behind the current time and date but it returns a refusal of decryption to the document managing section 30 if the time limit is behind the current time (Step ST-V10). It may be needless to say that the time limit managing section 60 is required to accurately keep time without any error. FIG. 9 shows the inside of the management TB 61 of the time limit managing section 60. The letter of order placement with document ID="A001" indicates that both "the order information (item name or names" and "the account settling information (NO)" authorize decryption until 0.00 a.m. of Sep. 1, 2005 but refuse any decryption after that time. It is desirable to add the PKI signature and the TS of this system in order to assure the originality and the credibility of the entry information.

(11) Upon acquiring the outcome of authorization of encryption, the document managing section 30 issues a request for acquiring the encryption key to the key generating/managing section 50 (Step ST-V11). At this time, the delivered information makes a retrieval index. A retrieval index refers to the document ID, the person who prepared the document and the secret position (the document ID: the person who prepared the document: the secret position). Thus, in the illustrated instance, "A001: Hanako Suzuki: and order information (the item name)) makes the retrieval index.

(12) The key generating/managing section 50 retrieves the target key information from the retrieval index (Step ST-V12).

(13) The document managing section 30 receives the encryption key from the key generating/managing section 50 and executes a decryption process on "the order information (the item name)" in "the encrypted letter of order placement [D1-2] by means of the secret key of the wholesaler (90-B) (Step ST-V13). At this time, when the secret key of the wholesaler (90-B) is taken into the partial integrity assurance system 10 having a viewers controlling feature, it is necessary to take measures for preventing the information from leaking for the purpose of security. For example, a technique of encrypting the secret key of the wholesaler (90-B) by means of the public key of the partial integrity assurance 10 having a viewers controlling feature may be used before taking it into the system.

(14) After the decryption process, the originality of the decrypted information is confirmed (Step ST-V14). More specifically, since "456+item A" is acquired as a result of the decryption, hash information is generated from the information of "456+item A" to obtain "DEF" as a result. Then, it is possible to confirm the originality of "the order information (the item name)" by taking out "DEF" from the "order information (the item name)" in the piat signature information [H1-1] and comparing the two "DEFs" (Step ST-V14-1 in FIG. 8). As a result of this verification, it is possible to prove to the third party that the letter of order placement described by the requester (90-A) has been neither altered nor replaced from the time of preparation and that the letter of order placement has been encrypted and any position in the letter of order placement has not been altered at the time of encryption along with the identity and the originality of the encrypted contents.

(15) Finally, the outcome of verification is returned to the wholesaler (90-B) to properly end the confirmation process (Step ST-V15). If an abnormal situation arises, the wholesaler (90-B) is notified of the error and the process ends abnormally.

(Sequence of Reception/Authorization of Letter of Order Placement)

FIG. 10 is a flowchart of the process of reception/authorization of a letter of order placement.

(1) As the process of confirmation of letter of order placement from the requester (90-A) is completed by the above-described sequence of confirmation of the letter of order placement followed by the wholesaler (90-B), the operation moves into the sequence of reception/authorization of the letter of order placement. With the sequence of reception/authorization of the letter of order placement, the wholesaler (90-B) receives the letter of order placement of the requester (90-A) and authorizes it.

(2) Upon receiving the notification of the outcome of verification in the last step of the above-described sequence of confirmation of the letter of order placement, the wholesaler (90-B) confirms to follow the sequence of reception/authorization (Step ST-U1).

(3) As the wholesaler (90-B) executes the process of finalizing the reception/authorization, the reception processing section 20 receives a request for a reception/authorization process.

(4) After receiving the request, the reception processing section 20 issues a request for a reception/authorization process to the document managing section 30 (Step ST-U2).

(5) Upon receiving the request for a reception/authorization process, the document managing section 30 adds an item indicating the authorization by the wholesaler (90-B) to the currently latest version of the letter of order placement [D1-2] and generates a new letter of order placement [D2], which it temporarily stores (Step ST-U3).

(6) A request for generation of piat signature information [H2] is issued to the piat signature generating section 41 in the piat signature processing section 40 (Step ST-U4). At this time, the latest version of the letter of order placement [D2] is delivered.

Figure 11:
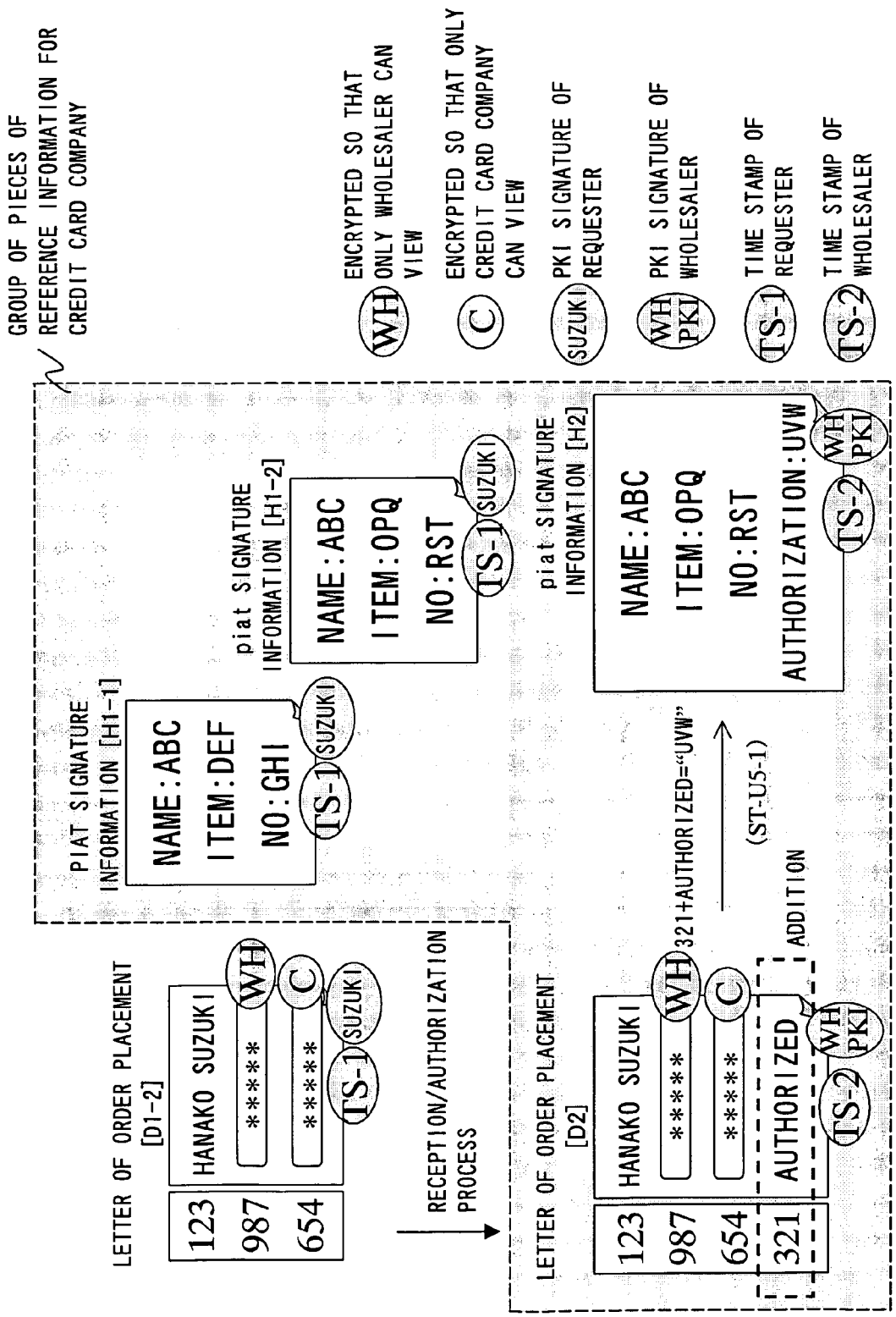
FIG. 11 is a schematic illustration of an example of generated piat signature information at the time of the reception/authorization process.

(7) Upon receiving the processing request, the piat signature generating section 41 generates piat signature information [H2] for the latest version of the letter of order placement [D2] (Step ST-U5). FIG. 11 is a schematic illustration of an example of generated piat signature information at the time of the reception/authorization process. A random number ("321") is added to the new item ("authorization") and a character string of "authorized" is linked to the random number to generate hash information for the character string of "321 authorized". FIG. 11 shows that hash information of "UVW" is output as a result of the generation (Step ST-U5-1 in FIG. 11). Since all the other items are not altered, the same random number is used to execute a generation process that is similar to the process of the last version.

(8) The document managing section 30 acquires the piat information [H2] from the piat signature generating section 41. Since the latest version of the letter of order placement [D2] and the piat signature information [H2] are in place at this time, the PKI signature of the wholesaler (90-B) and the TS are added to each piece of information and the two pieces of information are integrally stored in the DB 31 (Step ST-U6). At this time, [D1-1] and [H1-1] are separated from [D1-2] and [H1-2] and managed separately so that the version numbers are automatically managed.

(9) Finally, the latest version of the letter of order placement [D2] is returned to the wholesaler (90-B) to properly end the reception/authorization process (Step ST-U7). If an abnormal situation arises, the wholesaler (90-B) is notified of the error and the process ends abnormally. In this example, it is assumed that all the versions are stored in the DB 31 and managed and only the latest version of the letter of order placement [D2] is returned to the wholesaler (90-B). However, both the piat signature information [H2], the piat signature information [H1-1] and the piat signature information [H1-2] may be returned with the latest version of the letter of order placement [D2]. At this time, the wholesaler (90-B) may transmit all the four pieces of information including the latest version of the letter of order placement [D2], the piat signature information [H2], the piat signature information [H1-1] and the piat signature information [H1-2] (the group of pieces of reference information for the credit card company in FIG. 11) by means of electronic mail.

(Sequence of Confirmation of Letter of Order Placement (at the Side of Credit Card Company)

A flowchart similar to the one used for the confirmation process of the wholesaler as illustrated in FIG. 6 is used for the sequence of confirmation of the letter of order placement and hence it will not be shown here.

(1) The credit card company (90-B) receives a request for settling the account from the wholesaler by some means or other. At this time, the credit card company (90-C) may periodically connect itself to the portal site providing section 100 by way of the electronic communication channel 80 and acquire a request for settling the account (a list to be processed). Alternatively, the credit card company (90-C) may receive a request for settling the account directly from the wholesaler (90-B) by means of electronic mail. Anyway, the sequence starts when the credit card company receives the liquidation request sheet (a list to be processed) and confirms the letter of order placement in this example.

(2) The credit card company (90-C) typically connects itself to the portal site providing section 100 by way of the electronic communication channel 80 (Step ST-V1) and acquires and displays the liquidation request sheet (a list to be processed) (Step ST-V2).

(3) As the credit card company (90-C) selects the requester ((90-A)=Ms. Hanako Suzuki) from the liquidation request sheet, the portal site providing section 100 issues a confirmation processing request to the partial integrity assurance 10 having a viewers controlling feature (Step ST-V3).

(4) Then, the reception processing section 20 receives the confirmation processing request from the portal site providing section 100. The information that the reception processing section 20 receives at this time is the index of the letter of order placement of the requester ((90-A)=Ms. Hanako Suzuki).

(5) Upon receiving the confirmation processing request, the reception processing section 20 by turn issues a confirmation processing request to the document managing section 30.

(6) Upon receiving the confirmation processing request, the document managing section 30 firstly checks the management TB 32 on the basis of the index of the letter of order placement and acquires the letter of order placement from the DB 31 (Step ST-V4). The information the document managing section 30 acquires at this time includes four pieces of information, or the latest version of the letter of order placement [D2], the piat signature information [H2], the piat signature information [H1-1] and the piat signature information [H1-2]. In other words, the information includes the group of pieces of reference information for the credit card company in FIG. 11. Thus, the four pieces of information are referred to as "the group of pieces of reference information for the credit card company" hereinafter.

(7) As the acquisition process is completed, the document processing section 30 checks the effectiveness of the PKI signature and the TS added to the group of pieces of reference information for the credit card company (Step ST-V5).

(8) When it is confirmed that the PKI signature and the TS added to the group of pieces of reference information for the credit card company are effective, the document managing section 30 issues a confirmation request to the piat signature verifying section 42 in the piat signature processing section 40 for the group of pieces of reference information for the credit card company (Step ST-V6). At this time, the group of pieces of reference information for the credit card company is delivered.

(9) Upon receiving the processing request, the piat signature verifying section 42 executes a verification process, using the group of pieces of reference information for the credit card company (Step ST-V7). In the first stage, the confirmation process is executed by using three pieces of information including the latest version of the letter of order placement [D2], the piat signature information [H2] and the piat signature information [H1-2].

Figure 12:
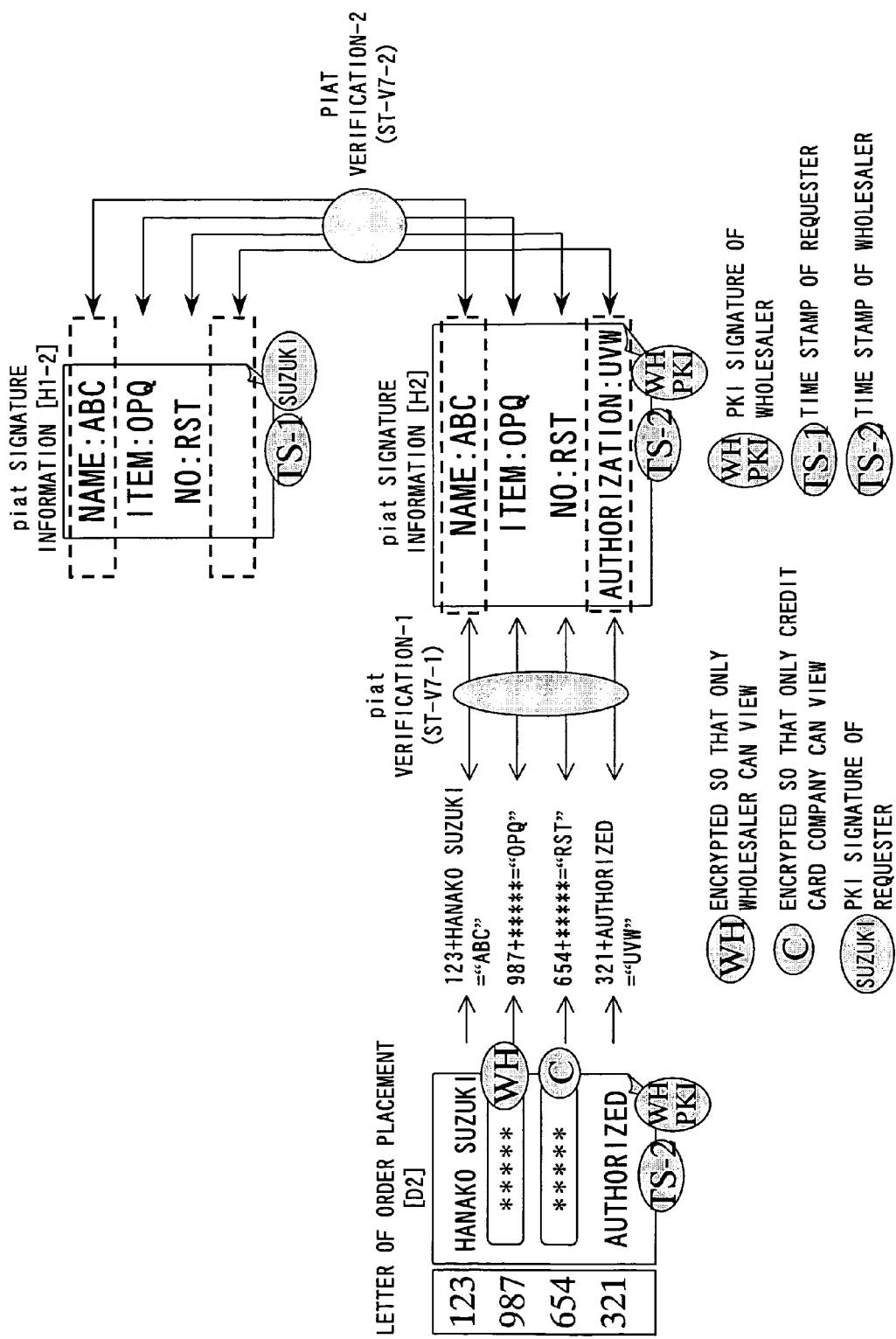
FIG. 12 is a schematic illustration of an example of confirmation (1st stage) of a group of pieces of reference information for a credit card company to be used in the confirmation process.

FIG. 12 is a schematic illustration of an example of confirmation (1st stage) of a group of pieces of reference information for a credit card company to be used in the confirmation process. Referring to FIG. 12, the random number "123" and the character string of "Hanako Suzuki (鈴木花子) are linked from the latest version of the letter of order placement [D2] and hash information is generated for the character string of "123 Hanako Suzuki (123 鈴木花子)". As a result, hash information of "ABC" is obtained. Additionally, FIG. 12 shows that the hash information of the name part is taken out from the piat signature information [H2] for comparison and confirmation (Step ST-V7-1: piat verification-1). A similar confirmation process is executed for each of the remaining items.

When it is confirmed that there is no problem as a result of the piat verification-1), subsequently, hash information is taken out for each item from the piat signature information [H1-2] and the piat information [H2] and compared to identify the altered position or positions (Step ST-V7-2: piat verification-2). With the piat verification-2 of this example, it is possible to confirm that the items including "the name", "the item name" and "NO" have not been altered since the time when the encrypted document [D1-2] was prepared and that, as for the item of "authorized", the item of "authorized" is added when the latest version of the letter of order placement [D2] was prepared because there is no hash information on the item of "authorized in the piat signature information [H1-2] generated from the encrypted document [D1-2]. Additionally, it is possible to confirm the following items from the PKI signature and the TS added to each piece of information.

As for the items of "the name", "the item name" and "NO", it is confirmed that the encrypted document [D1-2] has not been altered for them. Thus, it is possible to confirm that the requester (90-A) prepared the encrypted document [D1-2] and the wholesaler (90-B) added the item of "authorized". It is possible to confirm the above by presenting the group of pieces of reference information for the credit card company and the PKI signature and the TS added to the group of pieces of reference information for the credit card company.

Figure 13:
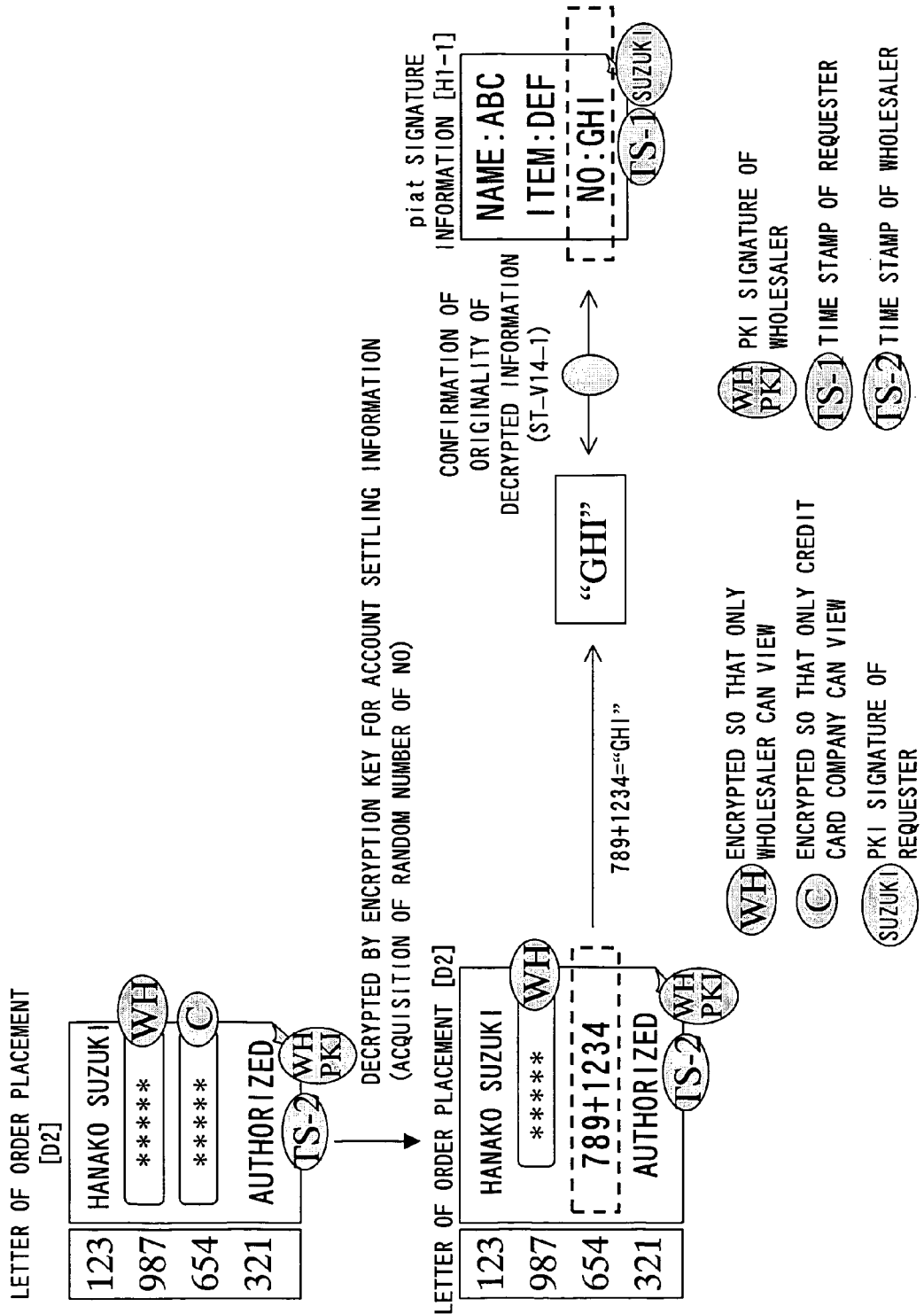
FIG. 13 is a schematic illustration of an example of confirmation (2nd stage) of a group of pieces of reference information for a credit card company to be used in the confirmation process.

(10) The document managing section 30 acquires the outcome of confirmation of the first stage from the piat signature verifying section 42. Then, it executes a confirmation process for the second stage by using the two pieces of information including the latest version of the letter of order placement [D2] and the piat signature information [H1-1]. FIG. 13 is a schematic illustration of an example of confirmation (2nd stage) of a group of pieces of reference information for the credit card company to be used in the confirmation process. Firstly, the latest version of the letter of order placement [D2] is to be decrypted. The document managing section 30 acquires "the secret position or positions", "the partial encryption information" and "the time limit information" in the management TB 32 from the index of the letter of order placement (Step ST-V8).

At this time, since it is possible to make sure that "the secret position or positions" have been encrypted by means of the public key of the credit card company (90-C), it is only possible to make sure that "the account settling information (NO)" can be decrypted. At this time, the document managing section 30 inquires the time limit managing section 60 (Step ST-V9). Then, "the document ID" and "the account settling information (NO)" are delivered from the document managing section 30 and the time limit managing section 60 checks the management TB 61 (see FIG. 9) of the time limit managing section 60 to acquire the time limit information and compares it with the current time and date. It authorizes the decryption if the time limit is not behind the current time and date but it returns a refusal of decryption to the document managing section 30 if the time limit is behind the current time (Step ST-V10).

(11) Upon acquiring the outcome of authorization of encryption, the document managing section 30 issues a request for acquiring the encryption key to the key generating/managing section 50 (Step ST-V11). At this time, the delivered information makes a retrieval index. A retrieval index refers to the document ID, the person who prepared the document and the secret position (the document ID: the person who prepared the document: the secret position). Thus, in the illustrated instance, "A001: Hanako Suzuki: and account settling information (NO)) makes the retrieval index.

(12) The key generating/managing section 50 retrieves the target key information from the retrieval index (Step ST-V12).

(13) The document managing section 30 receives the encryption key from the key generating/managing section 50 and executes a decryption process on the "account settling information (NO)" in the latest version of the letter of order placement [D2] by means of the secret key of the credit card company (90-C) (Step ST-V13).

(14) After the decryption process, the originality of the information on the decryption is confirmed (Step ST-V14). More specifically, since "789+1234" is acquired as a result of the decryption, hash information is generated from the information of "789+1234" to obtain "GHI" as a result. Then, it is possible to confirm the originality of "the account settling information (NO)" by taking out "GHI" from the "account settling information (NO)" in the piat signature information [H1-1] and comparing the two "GHIs" (Step ST-V14-1 in FIG. 13). As a result of this verification through the phase of the first stage and that of the second stage, it is possible to prove to the third party that the letter of order placement described by the requester (90-A) has been neither altered nor replaced from the time of preparation if the wholesaler (90-B) executed an additional process and that the letter of order placement has been encrypted and any position in the letter of order placement has not been altered at the time of encryption along with the identity and the originality of the encrypted contents.

(15) Finally, the outcome of verification is returned to the credit card company (90-C) to properly end the confirmation process (Step ST-V15). If an abnormal situation arises, the credit card company (90-C) is notified of the error and the process ends abnormally.

(Sequence of Acquisition of Letter of Order Placement)

Each of the users including the requester (90-A), the wholesaler (90-B) and the credit card company (90-C) can acquire the information on any of the letters of order placement accumulated in the information publicizing DB 71 in the information publicizing section 70. The acquired information can be used and produced to the third party for the purpose of confirming and verifying the letter of order placement that has been processed and when a dispute such as a lawsuit arises among the concerned parties. The acquisition process and the process of confirming and verifying the acquired information on the letter of order placement in the acquisition sequence are same as those of the above-described sequence of confirming a letter of order placement and hence will not be described here any further.

Now, the information publicizing scheme of a local government document management system adapted to use this system will be described below.

When a user uses this system, he or she records and stores an electronically prepared official document of a local government with a signature. Additionally, the recorded/stored and signed official document may be distributed to the disclosure requester and, if necessary, presented to the third party for the purpose of checking the authenticity of the disclosed official document. When it is distributed to the disclosure requester, it may be required to be subjected to partial disclosures or non-disclosures if necessary.

For example, it may be conceivable that the official document is required to be partly concealed from the third party on the way of getting to the disclosure requester. More specifically, one or more than one parts of the official document may have to be concealed from the third party so that only the disclosure requester may be able to view the part or parts or one or more than one parts of the official document may have to be completely blotted out and concealed not only from the third party but also from the disclosure requester.

When one or more than one parts of the official document may have to be concealed from the third party, the official document is required to be controllable for partial disclosures and non-disclosures and the properness and the proof-worthiness of the operations done for disclosures and non-disclosures have to be assured in order to prove that the non-disclosure part of the information is not leaked to anyone other than the authorized viewer or viewers, that the information is not altered except the non-disclosure part thereof (originality, integrity) and that the non-disclosure part of the information is prepared by the requester and has not been altered.

Therefore, the user uses this system as a section that keeps a record that can be produced as evidence when a dispute arises from the official document and is taken to court or when proving to the third party the authenticity of the official document. In the following, an application for the use of a public building will be described as an example.

Thus, the characters who appear in the scene of utilization of this system include "an applicant" who applies for the use of the public building, "a ward official" who receives the application from the applicant and registers it in this system as a public document and "a viewer" who requests a group of public documents to be disclosed.

Figure 14:
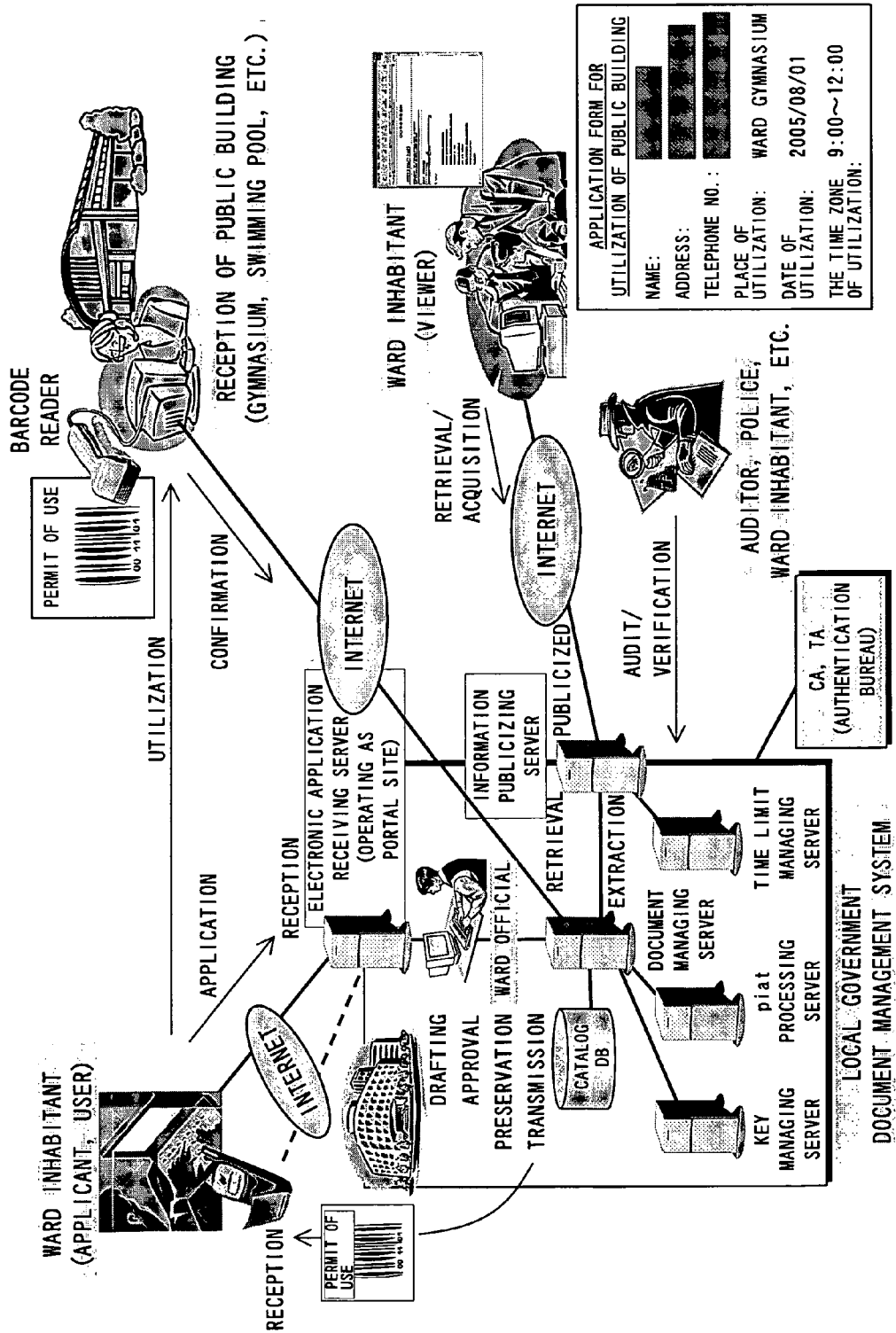
FIG. 14 is a schematic illustration of an embodiment applied to applications for utilizing public buildings.

FIG. 14 is a schematic illustration of an embodiment applied to applications for utilizing public buildings. The local government document management system of FIG. 14 corresponds to a partial integrity assurance system 10 having a viewers controlling feature that is a system according to the present invention. The electronic application receiving server in FIG. 14 corresponds to the reception processing section 20 and the portal site providing section 100 in FIG. 1 and the document managing server in FIG. 14 corresponds to the document managing section 30 in FIG. 1, while the piat processing server and the key managing server, the time limit managing server, the information publicizing server and the applicant/viewer in FIG. 14 respectively correspond to the piat signature processing section 40, the key generating/managing section 50, the time limit managing section 60, the information publicizing section 70 and the users 90 in FIG. 1 and the CA and TA (authentication bureau) respectively correspond to the CA 200 and the TA 300 in FIG. 14.

Each of the characters and his or her actions of this embodiment will be described below.

(Ward Inhabitant (Applicant/User))

The applicant electronically applies for the use of a public building. At this time, the applicant may use a personal computer, a mobile phone or a PDA (personal digital assistance) for the application.

(Local Government Document Management System, Ward Official)

The ward official receives the electronic application form from the ward inhabitant (applicant/user), prepares a draft, gets necessary approvals, transmits a permit, preserves the related documents, retrieves necessary documents and publicizes any of the documents. The local government document management system comprises six modules including an electronic application receiving server, a document managing server, an information publicizing server, a time limit managing server, a piat processing server and a key managing server. The operation of each of the modules will be described below.

(Electronic Application Receiving Server)

The electronic application receiving server receives electronic applications from ward inhabitants (applicants/users). This server also takes the role of a portal site.

(Document Managing Server)

The document managing server manages and preserves the approved official documents produced to ward inhabitants (applicants/users).

(Information Publicizing Server)

The information publicizing server blots out the secret positions of the approved documents, preserves them and publicizes them to ward inhabitants (viewers).

(Time Limit Managing Server)

The time limit managing server controls disclosures and non-disclosures of the secret positions of the approved official documents that are publicized from the ward office.

(Piat Processing Server)

The piat processing server operates to generate partial signatures for any of the approved documents preserved in the document managing server and verify partial signatures.

(Key Managing Server)

The key managing server operates to generate and manage encryption keys for controlling the viewer of any of the approved documents preserved in the document managing server.

(Ward Inhabitants (Viewers)), (Auditors, Police, Ward Inhabitants and so on)

Ward inhabitants can retrieve and view any of the approved official documents publicized by the ward office. If necessary, ward inhabitants can ask for proving to the third party. These characters are collectively referred to as "viewers" hereinafter.

(CA, TA (Authentication Bureau)

The CA and TA gives electronic signatures, time stamps and other information for proving to the third party and confirms the validity of electronic signatures and time stamps.

(Receptions of Public Buildings (Gymnasiums, Swimming Pools, Etc.)

The reception of each public building receives the permit of each user and checks its validity and authenticity.

In the above-described scene of utilization, this system provides the following three functions to the applicant, the ward officer and the viewer.

(A) Reception function (to be used by the applicant at the time of application)
(B) Registration function (to be used by the ward officer at the time of registration of an official document)
(C) Acquisition function (to be used by the applicant and the viewer at the time of acquiring an official document)

Now, the effects of the above listed events (A) through (C) will be described below.

It is assumed here as the requirement to be met in advance for this scene of utilization that the user authenticating information of the users including the applicant, the ward official and the viewer are registered in advance so that the users may use the system and are rigorously controlled for accesses.

(Sequence of Reception/Registration of Application)

Figure 15:
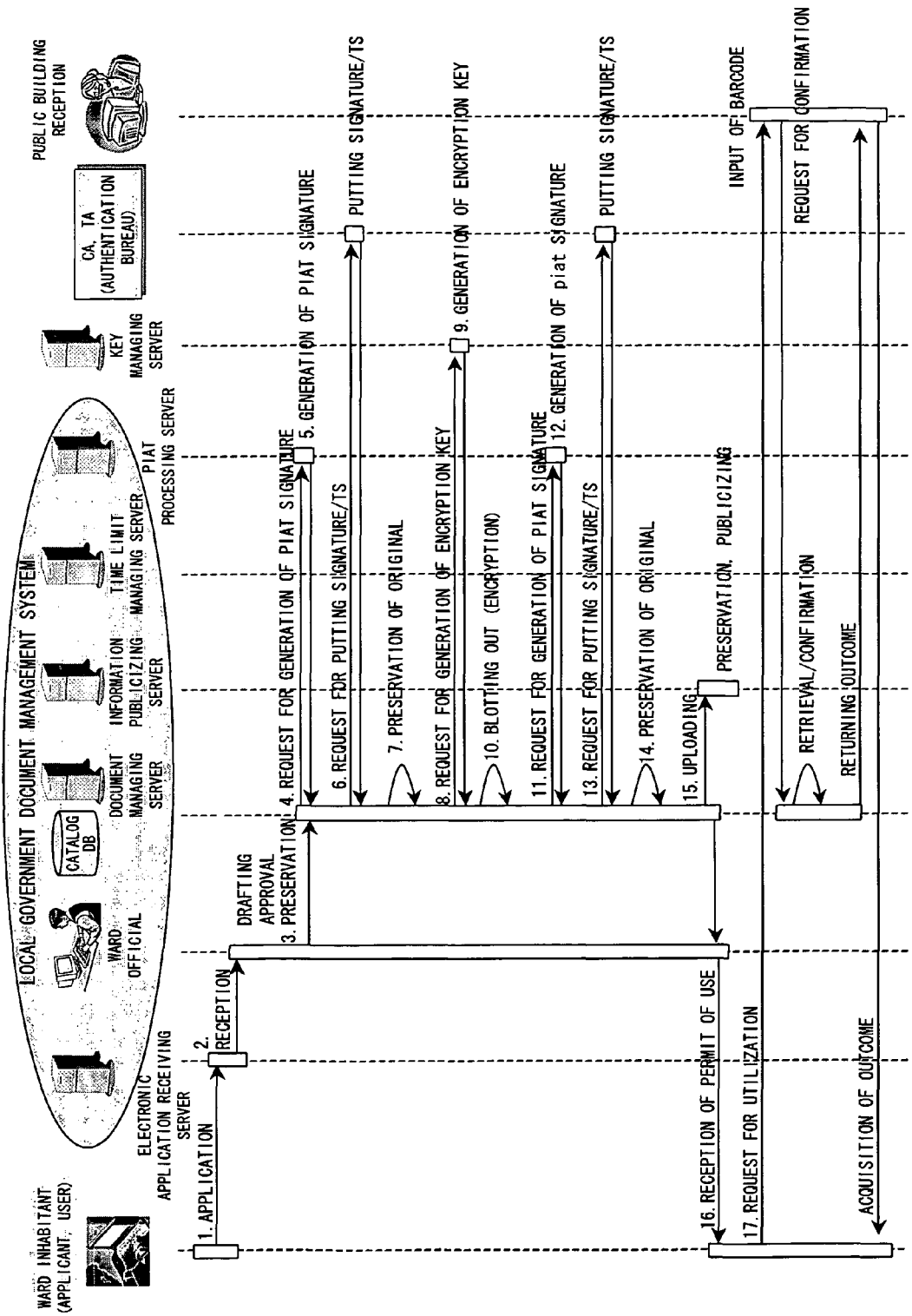
FIG. 15 is a flowchart of the reception/registration process for an application for utilizing a public building.

FIG. 15 is a flowchart of the reception/registration process for an application for utilizing a public building.

(1) The applicant connects him or herself to the electronic application receiving server by way of Internet and accesses the electronic application receiving server. At this time, it is assumed that the applicant has already been registered as user at the electronic application receiving server. The applicant typically logs in by means of his or her ID and a password and input necessary information in the application input form. At this time, assume that information to be input includes personal information for identifying the applicant such as the name, the address, the place of utilization, the date of utilization, the time zone of utilization and so on. As the applicant executes a post-input finalization process, the application form is temporarily stored in the electronic application receiving server.

(2) The application forms accumulated in the electronic application receiving server are processed for reception/confirmation by the ward officer the next day and handled sequentially for reception, drafting and approval. At this time, each application is linked to a security policy and one or more than one secret positions are defined at the time of drafting.

(3) As the above-described reception/confirmation process is completed, the operation moves into the phase of preservation. The ward official issues a request for a preservation process to the document managing server.

(4) Upon receiving the request for a preservation process, the document managing server issues a request for generating piat signature information [H1-1] to the piat processing server. At this time, the application form [D1-1] is delivered.

(5) Upon receiving the generation request, the piat processing server generates piat signature information [H1-1] for the application form [D1-1]. FIG. 3 that illustrates an example of generation of piat signature information is also applicable to this generation process. Additionally, the basic principle underlying the method of generating piat signature information that is used in the encryption process is same as the one described above for the first scene and hence will not be described here any further. The document managing server acquires the piat signature information [H1-1] from the piat processing server.

(6) Upon receiving the piat signature information [H1-1] from the piat processing server, the document managing server moves into the phase of adding a PKI signature and a TS. Since the application form [D1-1] and the piat signature information [H1-1] are in place at this time, the document managing server puts a PKI signature and a TS to each piece of information. Thus, it is possible to underline the credibility and the truthfulness of the information and rigorously prove to the third party by adopting the PKI signature and the time stamp issued respectively by the CA and the TA that are public organizations.

(7) The two pieces of information including the application form [D1-1] and the piat signature information [H1-1] to each of which a PKI signature and a TS are put are integrally preserved in the catalogue DB in the document managing server as originals.

(8) Then, the operation moves into the phase of partial encryption. A request for generating an encryption key is issued to the key generating/managing server for the purpose of generation of a key for encryption. At this time, the secret position or positions defined at the time of drafting are processed for encryption. In this example, it is assumed that three pieces of information including "the name", the "address" and "the telephone number" are encrypted and controlled for concealment so that only the applicant can view them at the time of requesting a document to be disclosed. In other words, the application form can be viewed on the basis of the information publicizing law but the above three pieces of information are concealed from the viewpoint of the personal information protection law.

(9) The key managing server generates a encryption key (common key) for "the name", "the address" and "the telephone number" and stores it in the key managing server. More specifically, the encryption key is stored in a manner as described below. The encryption key (common key) for "the name", "the address" and "the telephone number" is encrypted by the publicized key information of the applicant in this example. Since there are no plurality of viewers in this example and hence it is sufficient to control a single viewer for the three pieces of information, there arises no problem when a same key is used for the controlling/managing the information. Additionally, the encryption key is protected against leakage after the decryption when the time limit managing server controls/manages the encryption key (common key). In other words, it is possible to prevent the above listed three pieces of information contained in the encrypted application form from leaking. For example, the security of the application form can be ensured by so arranging that the application form can be decrypted in two years from the time of application (and hence can be viewed) but cannot be decrypted after the elapse of two years since the time of application.

(10) The document managing server receives the encryption key from the key managing server and executes an encryption process on the secret positions in the application form [D1-1]. The operation of generating piat signature information at the time of the encryption process is same as the one described above for Step ST-C9-1 by referring to FIG. 3. Additionally, the basic principle underlying the method of generating piat signature information that is used in the encryption process is same as the one described above for the first scene and hence will not be described here any further.

(11) Subsequently, the document managing server issues a request for generating piat signature information [H1-2] to the piat processing server. At this time, the temporarily stored partly encrypted application form [D1-2] is delivered to it.

(12) The piat processing server that receives the processing request generates piat signature information [H1-2] for the partly encrypted application form [D1-2]. When generating the piat signature information, the piat processing server alters the random numbers of "the name", the "address" and "the telephone number" encrypted from the application form [D1-1] and then generates new piat signature information [H1-2] but uses the random numbers for "the place of utilization", "the date of utilization" and "the time zone of utilization" (which are the positions that are not encrypted and not altered since the last process) same as those of the application form [D1-1]. Thus, it is possible to prove to the third party that any positions other than the encrypted positions have not been altered by comparing the generated two pieces of piat signature information [H1-1] and [H1-2]. The description of Step ST-C11-1 given above for the first scene by referring to FIG. 3 also applies here and the underlying principle is same as that of the first scene. The document managing server acquires the piat signature information [H1-2] from the piat processing server.

(13) The document managing server that receives the piat signature information [H1-2] from the piat processing server then moves into the phase of putting a PKI signature and a TS. Since the application form [D1-2] and the piat signature information [H1-2] are in place at this time, the document managing server puts the PKI signature of the applicant and the TS to each piece of information. Thus, it is possible to underline the credibility and the truthfulness of the information and rigorously prove to the third party by adopting the PKI signature and the time stamp issued respectively by the CA 200 and the TA 300 that are public organizations.

(14) The two pieces of information including the application form [D1-2] and the piat signature information [H1-2] to each of which a PKI signature and a TS are put are integrally preserved in the catalogue DB in the document managing server as originals. At this time, they are separated from the letter of order placement [D1-1] and the piat signature information [H1-1] that have already been stored for management. In this way, the version numbers are automatically managed. Thus, it is possible to prove to the third party the condition of the version of an appropriate version number whenever necessary by using the DB having the version number managing feature. As all the processing steps are completed normally, the information on the application form is entered in the management TB in the document managing server. The arrangement of entries of the management TB in the document managing server is same as that of FIG. 5. Pieces of basic information and the arrangement thereof are similar to those described above by referring to FIG. 5 and hence they will not be described here any further.

(15) Finally, the application form [D1-2] that is currently the latest version is uploaded to the information publicizing server and registered and publicizing index.

(16) The reception/registration process for the application for the use of the public building is normally completed and a permit of use is sent to the applicant. If an abnormal situation arises, the applicant is notified of the error and the process ends abnormally.

(17) After the completion of the process, the applicant who receives the permit of use can use the public building. The reception terminal of the public building is provided with a barcode reader so that it is possible for the person in charge of the public building to read the barcode printed on the permit of use and communicate with the document managing server in the ward office on a real time basis for the purpose of confirming the validity of the permit of use, if necessary. The sequence of reception/registration of an application is described above.

Now, the sequence of acquisition/viewing of a public document will be described below. For the sequence of acquisition/viewing of a public document that will be described below, two scenes including a scene where the viewer acquires from the information publicizing server and views as official document the application form for utilizing the public building that is submitted by the applicant and received, authorized, preserved and publicized by the ward office and a scene where the third party who is not the applicant but a ward inhabitant, the auditor or a police officer acquires and views the application form are assumed.

Firstly, the sequence of acquisition/viewing of a public document to be followed by the applicant him- or herself will be described below.

(Sequence of Acquisition/Viewing (Applicant))

Figure 16:
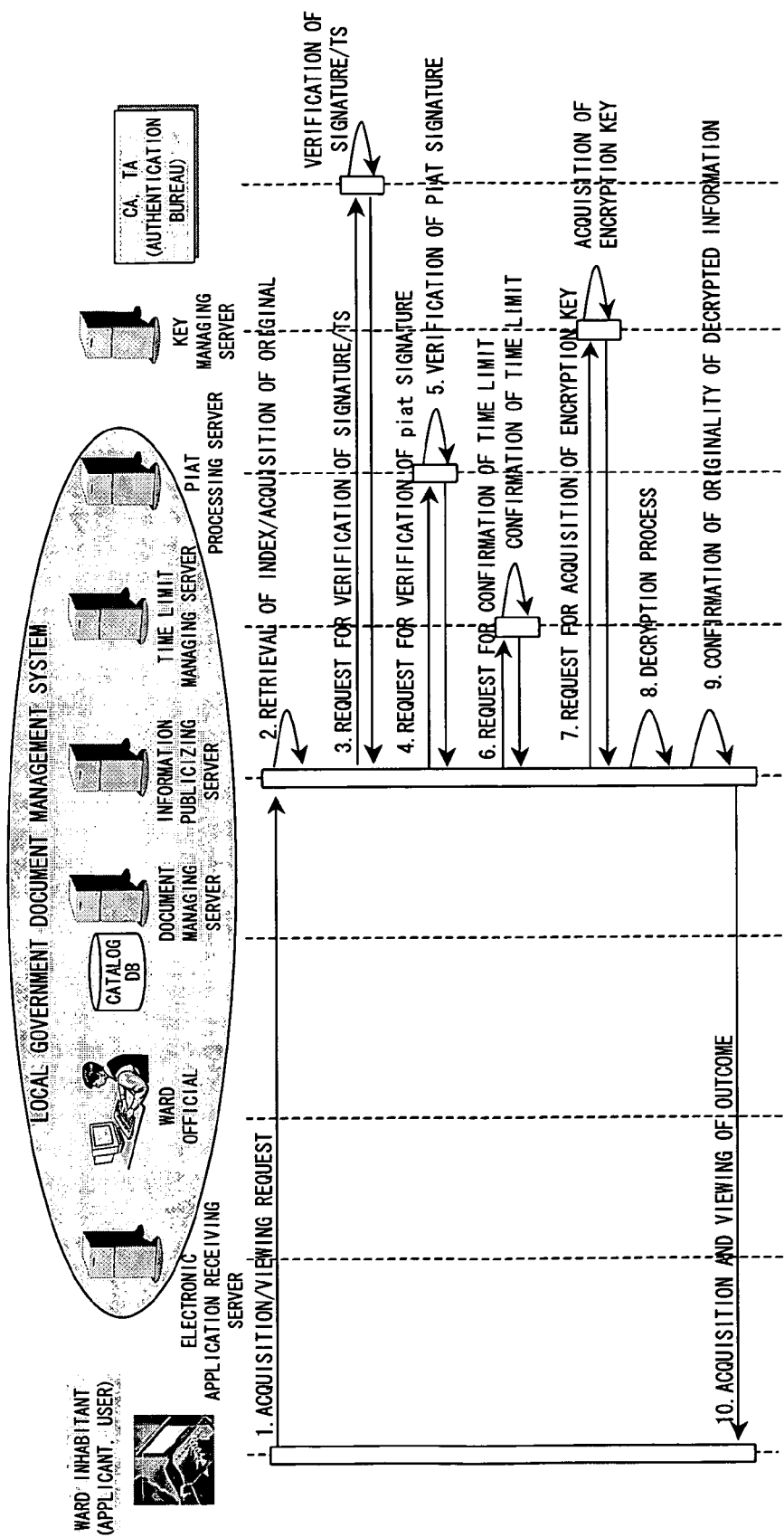
FIG. 16 is a flowchart of the official document acquisition/viewing process for an applicant.

FIG. 16 is a flowchart of the official document acquisition/viewing process for the applicant.

(1) The applicant connects him- or herself to and accesses the information publicizing server by way of Internet. It is assumed here that the applicant is registered as user in the information publicizing server. The applicant logs in typically by using an ID or a password. The information publicizing server keeps the indexes of the publicized official documents and the applicant can pick up the official document he or she wants to acquire and view from the list of the indexes. It is also assumed here that the applicant acquires and views an official document that is the application form for utilizing a public building submitted by the applicant him- or herself.

(2) Upon receiving a request of acquisition/viewing from the applicant, the information publicizing server looks into the database by referring to the specified index in order to retrieve the specified official document and, if it is found, it acquires the original of the official document from the database. At this time, the information publicizing server acquires three pieces of information including the encrypted official document [D1-2], the piat signature information [H1-1] and the piat signature information [H1-2]. These three pieces of information are referred to as "the piat verification information group" hereinafter.

(3) When the acquisition process is completed, the information publicizing server confirms the effectiveness of the PKI signature and the TS put to the piat verification information group. This confirmation is necessary because the verification is performed after the uploading to the information publicizing server and the information publicizing server needs to check if the information has been altered or not. As for the PKI signature, the information publicizing server inquires the TA for the CA and the TS and obtains the outcome of verification.

(4) When it is confirmed that the PKI signature and the TS put to the piat verification information group are effective, the information publicizing server issues a request for verifying the piat verification information group to the piat processing server. At this time, the piat verification information group is delivered to the piat processing server.

(5) Upon receiving the verification request, the piat processing server executes a verification process, using the piat verification information group. The process of confirming the piat signature information is same as the one described above by referring to FIG. 8. Additionally, the basic principle underlying the method of confirming piat signature information is same as the above-described one and hence will not be described here any further.

(6) The information publicizing server acquires the outcome of confirmation from the piat processing server. Then, the operation moves into the phase of decrypting the encrypted official document [D1-2]. In this phase, the information publicizing server issues a time limit confirmation request to the time limit managing server. The time limit managing server looks into the managing TB preserved in the time limit managing server, acquires the applicable time limit and compares it with the current time and date. It sends permission of decryption back to the information publicizing server if the time limit is not behind the current time and date, whereas it sends refusal of decryption back to the information publicizing server if the time limit is behind the current time and date. It may be needless to say that the time limit managing server is indispensably required to accurately keep the current time and date without error. The arrangement of entries of the management TB in the time limit managing server is same as that of FIG. 9. Pieces of basic information and the arrangement thereof are similar to those described above by referring to FIG. 9 and hence they will not be described here any further.

(7) As the information publicizing server obtains permission of decryption, it issues a request for acquiring the corresponding encryption key to the key managing server. The information delivered to the key managing server at this time is a retrieval index. A retrieval index refers to "the document ID: the person who prepared the document: the position or positions of concealment". Then, the key managing server retrieves the target key information by using the retrieval index.

(8) The information publicizing server receives the encryption key from the key managing server and executes a decryption process on "the name, "the address" and "the telephone number" in the encrypted official document [D1-2] by means of the secret key of the applicant.

(9) After the decryption process, the originality of the decrypted information is confirmed. This operation is identical with Step ST-V14-1 described earlier by referring to FIG. 8 and based on the same basic principle. As a result of this verification, it is possible to prove to the third party that the application form described by the application has been neither altered nor replaced from the time of preparation and that the official document has been encrypted and any position in the official document has not been altered at the time of encryption along with the identity and the originality of the encrypted contents. Since the applicant him- or herself decrypts the encrypted positions, it is not necessary to confirm the originality of the decrypted information.

(10) Finally, the outcome of verification is returned to the applicant with the official document and the applicant confirms the contents to properly end the acquisition/viewing process. If an abnormal situation arises, the applicant is notified of the error and the process ends abnormally.

Now, the sequence of acquisition/viewing of an official document to be followed by a person other than the applicant him- or herself will be described below.

(Sequence of Official Document Acquisition/Viewing (Viewer))

Figure 17:
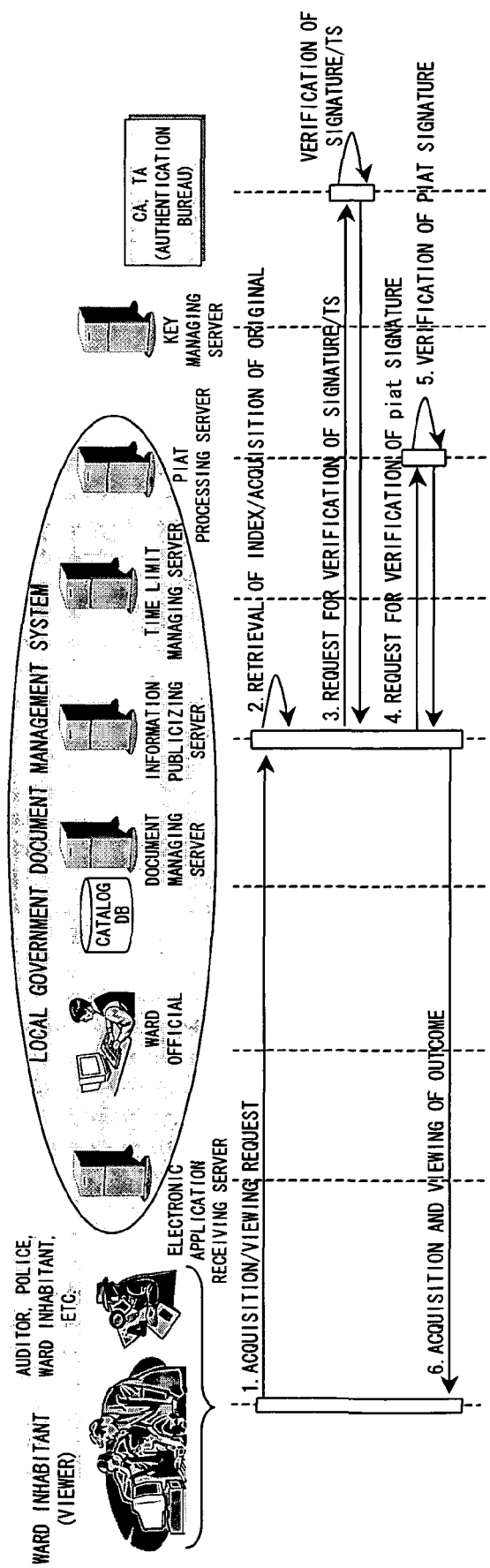
FIG. 17 is a flowchart of the official document acquisition/viewing process for a viewer.

FIG. 17 is a flowchart of the official document acquisition/viewing process.

(1) The viewer connects him- or herself to and accesses the information publicizing server by way of Internet. It is assumed here that the viewer is registered as user in the information publicizing server. The viewer logs in typically by using an ID or a password. The information publicizing server keeps the indexes of the publicized official documents and the viewer can pick up the official document he or she wants to acquire and view from the list of the indexes.

(2) Upon receiving a request of acquisition/viewing from the viewer, the information publicizing server looks into the database by referring to the specified index in order to retrieve the specified official document and, if it is found, it acquires the original of the official document from the database. At this time, the information publicizing server acquires three pieces of information including the encrypted official document [D1-2], the piat signature information [H1-1] and the piat signature information [H1-2]. These three pieces of information are referred to as "the piat verification information group" hereinafter.

(3) When the acquisition process is completed, the information publicizing server confirms the effectiveness of the PKI signature and the TS put to the piat verification information group. This confirmation is necessary because the verification is performed after the uploading to the information publicizing server and the information publicizing server needs to check if the information has been altered or not. As for the PKI signature, the information publicizing server inquires the TA for the CA and the TS and obtains the outcome of verification.

(4) When it is confirmed that the PKI signature and the TS put to the piat verification information group are effective, the information publicizing server issues a request for verifying the piat verification information group to the piat processing server. At this time, the piat verification information group is delivered to the piat processing server.

(5) Upon receiving the verification request, the piat processing server executes a verification process, using the piat verification information group. The process of confirming the piat signature information is same as the one described above by referring to FIG. 8. Additionally, the basic principle underlying the method of confirming piat signature information is same as the above-described one and hence will not be described here any further.

(6) Finally, the outcome of verification is returned to the viewer with the official document and the viewer confirms the contents. The viewer obtains the following pieces of information as a result of verification. Firstly, the viewer can confirm that "the name", "the address" and "the telephone number" are blotted out by the ward official and the relevant positions other than the above listed concealed positions ("the place of utilization", "the date of utilization" and "the time zone of utilization") have not been altered since the time of application. At this time, while it is also possible to see the person who described the official document other than the concealed positions, the person who described the official document is not disclosed from the viewpoint of protection of personal information. Thus, the acquisition/viewing process ends properly. If an abnormal situation arises, the applicant is notified of the error and the process ends abnormally.

The above-described scene of utilization may take place when the police looks into the matter to see if the official document can be used as an alibi by the applicant him- or herself or when the police suspects a case and uses the official document to see if the ward gymnasium was being used at the time and date in question. In such a particular occasion, the police officer may view the official document as viewer and decrypts the blotted positions as the applicant can do to see all the information in the official document. In either event, it is possible to obtain the above-described outcome.

Thus, the above-described embodiment of the present invention can meet the requirements that any known techniques and combinations thereof cannot meet. Additionally, the above-described embodiment can establish the perfectness and the originality of the blotted (altered) document if compared with the most resembling known techniques.

With the above-described embodiment of the present invention, it is possible to cause a computer to store the processing steps according to the present invention in a computer readable recording medium as an electronic document management program and have the computer execute the program. Computer readable recording mediums that can be used for the purpose of the present invention include portable storage mediums such as CD-ROMs, flexible disks, DVDs, magneto-optical disks and IC cards, databases adapted to hold computer programs, other computers, and the databases of such computers.

What is claimed is:

1. A computer-readable medium having recorded thereon an electronic document management program that causes a computer to execute a process comprising:
   dividing original information into a plurality of parts;
   generating hash information corresponding to information of a part for each of the plurality of parts by using a one-way hash function for the information of the part coupled with a random number, so as to generate first signature information corresponding to the original information;
   encrypting the information coupled with the random number for information of a non-disclosure part of the original information by using an encryption key, and generating partial encrypted original information where the information of the non-disclosure part of the original information is replaced with encrypted information;
   generating hash information corresponding to the encrypted information by using a one-way hash function for the encrypted information of the non-disclosure part coupled with a random number which is different from the random number used for the encrypted information so as to generate second signature information corresponding to the partial encrypted original information where only the information of the non-disclosure part for the first signature information is replaced with the hash information corresponding to the encrypted information;
   proving that the partial encrypted original information is not altered except for the non-disclosure part by comparing the first signature information with the second signature information; and
   decrypting the encrypted information of the non-disclosure part included in the partial encrypted original information by using a decryption key corresponding to the encryption key, generating hash information by using a one-way hash function for decrypted information which is coupled with the random number, and comparing generated hash information with the hash information corresponding to the non-disclosure part included in the first signature information so as to prove that the information of the non-disclosure part is not altered.

2. The computer-readable medium according to claim 1, wherein the electronic document management program causes the computer to execute the process further comprising:
   receiving management of document information;
   managing time limit information of the encryption key for decrypting the encrypted at least one of the plurality of parts; and
   publishing information based on the original information, the first signature information and the second signature information.

3. The computer-readable medium according to claim 2, wherein the managing time limit information holds time limit information on the encryption key, and controls accesses to the original information by using the time limit information.

4. The computer-readable medium according to claim 2, wherein the electronic document management program causes the computer to execute the process further comprising:
   nullifying the encryption key and accesses to the original information when an effective period of the encryption key is expired according to the time limit information on the encryption key managed by the managing the time limit information.

5. The computer-readable medium according to claim 2, wherein the publishing information acquires, accumulates and publicizes only publicized information in cooperation with the registering.

6. The computer-readable medium according to claim 1, wherein the electronic document management program causes the computer to execute the process further comprising:
   generating the encryption key for decrypting the encrypted at least one of the plurality of parts; and
   encrypting the encryption key by using a public key of an entity authorized for viewing the original information so as to manage the encrypted encryption key.

7. An electronic document management apparatus comprising:
   a document managing section that encrypts information of a non-disclosure part coupled with a random number for the non-disclosure part of original information which is divided into a plurality of parts, by using an encryption key, and generates partial encrypted original information where information of the non-disclosure part is replaced with encrypted information;
   a partial signature information generation section that performs a process of generating hash information corresponding to information for each of the plurality of parts by using a one-way hash function for information of the plurality of parts coupled with a random number, so as to generate first signature information corresponding to the original information, and a process of generating hash information corresponding to the encrypted information by using a one-way hash function for the encrypted information of the non-disclosure part coupled with a random number which is different from the random number used for the encrypted information so as to generate second signature information corresponding to the partial encrypted original information where only the information of the non-disclosure part for the first signature information is replaced with the hash information corresponding to the encrypted information;

a partial signature verification section that performs a process of proving that the partial encrypted original information is not altered except for the non-disclosure part by comparing the first signature information with the second signature information and a process of decrypting the encrypted information of the non-disclosure part included in the partial encrypted original information by using a decryption key corresponding to the encryption key, generating hash information by using a one-way hash function for decrypted information which is coupled with the random number, and comparing generated hash information with the hash information corresponding to the non-disclosure part included in the first signature information so as to prove that the information of the non-disclosure part is not altered.

8. The apparatus according to claim 7, further comprising:
a reception processing section that receives management of document information;
a time limit managing section that manages time limit information of the encryption key for decrypting the encrypted at least one of the plurality of parts; and
an information publicizing section that publicizes information based on the original information, the first signature information and the second signature information managed in the document managing section.

9. The apparatus according to claim 7, further comprising:
a key generating/managing section that generates the encryption key for decrypting the encrypted at least one of the plurality of parts, and encrypts the encryption key by using a public key of an entity authorized for viewing the original information so as to manage the encrypted encryption key.

10. An electronic document management method comprising:
dividing original information into a plurality of parts;
generating hash information corresponding to information of a part for each of the plurality of parts by using a one-way hash function for the information of the part coupled with a random number, so as to generate first signature information corresponding to the original information;
encrypting the information coupled with the random number for information of a non-disclosure part of the original information by using an encryption key, and generating partial encrypted original information where the information of the non-disclosure part of the original information is replaced with encrypted information;
generating hash information corresponding to the encrypted information by using a one-way hash function for the encrypted information of the non-disclosure part coupled with a random number which is different from the random number used for the encrypted information so as to generate second signature information corresponding to the partial encrypted original information where only the information of the non-disclosure part for the first signature information is replaced with the hash information corresponding to the encrypted information;
proving that the partial encrypted original information is not altered except for the non-disclosure part by comparing the first signature information with the second signature information; and
decrypting the encrypted information of the non-disclosure part included in the partial encrypted original information by using a decryption key corresponding to the encryption key, generating hash information by using a one-way hash function for decrypted information which is coupled with the random number, and comparing generated hash information with the hash information corresponding to the non-disclosure part included in the first signature information so as to prove that the information of the non-disclosure part is not altered.

11. The method according to claim 10, further comprising:
receiving management of document information;
managing time limit information of the encryption key for decrypting the encrypted at least one of the plurality of parts; and
publishing information based on the original information, the first signature information and the second signature information.

12. The method according to claim 11, wherein the managing time limit information holds time limit information on the encryption key, and controls accesses to the original information by using the time limit information.

13. The method according to claim 11, wherein the electronic document management program causes the computer to execute the process further comprising:
nullifying the encryption key and accesses to the original information when an effective period of the encryption key is expired according to the time limit information on the encryption key managed by the managing the time limit information.

14. The method according to claim 11, wherein the publishing information acquires, accumulates and publicizes only publicized information in cooperation with the registering.

15. The method according to claim 10, further comprising:
generating the encryption key for decrypting the encrypted at least one of the plurality of parts; and
encrypting the encryption key by using a public key of an entity authorized for viewing the original information so as to manage the encrypted encryption key.

* * * * *